US012489869B2

(12) United States Patent
Yin et al.

(10) Patent No.: US 12,489,869 B2
(45) Date of Patent: Dec. 2, 2025

(54) INTERACTION PROCESSING METHOD AND APPARATUS, TERMINAL AND MEDIUM

(71) Applicant: Tencent Technology (Shenzhen) Company Limited, Shenzhen (CN)

(72) Inventors: Wenjing Yin, Shenzhen (CN); Zebiao Huang, Shenzhen (CN); Xianyang Xu, Shenzhen (CN); Shu-Hui Chou, Shenzhen (CN); Zhimiao Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 314 days.

(21) Appl. No.: 18/134,166

(22) Filed: Apr. 13, 2023

(65) Prior Publication Data

US 2023/0247178 A1    Aug. 3, 2023

Related U.S. Application Data

(63) Continuation of application No. PCT/CN2022/088332, filed on Apr. 22, 2022.

(30) Foreign Application Priority Data

May 31, 2021    (CN) .......................... 202110606182.7

(51) Int. Cl.
*H04N 7/15* (2006.01)
*G06F 3/04842* (2022.01)
(Continued)

(52) U.S. Cl.
CPC ......... *H04N 7/157* (2013.01); *G06F 3/04842* (2013.01); *G06T 17/205* (2013.01);
(Continued)

(58) Field of Classification Search
None
See application file for complete search history.

(56) References Cited

U.S. PATENT DOCUMENTS

| 10,354,256 | B1 | 7/2019 | McInerny |
| 2004/0128350 | A1* | 7/2004 | Topfl ...................... H04N 7/147 709/204 |

(Continued)

FOREIGN PATENT DOCUMENTS

| CN | 103814568 A | 5/2014 |
| CN | 105554429 A | 5/2016 |

(Continued)

OTHER PUBLICATIONS

Tencent Technology, WO, PCT/CN2022/088332, Jul. 20, 2022, 5 pgs.

(Continued)

*Primary Examiner* — Duc Nguyen
*Assistant Examiner* — Assad Mohammed
(74) *Attorney, Agent, or Firm* — Morgan, Lewis & Bockius LLP

(57) ABSTRACT

Embodiments of this application provide a method and apparatus, a terminal and a medium. The method includes the following steps. A target terminal displays, in a video session, a video session interface including an image display region for displaying images associated with one or more users participating in the video session. The target terminal displays a target virtual image of a user of the target terminal in the image display region. The target terminal acquires movement information of the user and controls the target virtual image displayed in the image display region to perform a target interaction action corresponding to the movement information of the user. Finally, the target terminal transmits movement data of the target virtual image performing the target interaction action, to terminals of the (Continued)

other users of the video session to render the target virtual image to perform the target interaction action on the corresponding terminals.

17 Claims, 18 Drawing Sheets

(51) Int. Cl.
*G06T 17/20* (2006.01)
*G06V 10/44* (2022.01)
*G06V 40/16* (2022.01)
*G06V 40/20* (2022.01)

(52) U.S. Cl.
CPC ............ *G06V 10/44* (2022.01); *G06V 40/174* (2022.01); *G06V 40/20* (2022.01)

(56) References Cited

U.S. PATENT DOCUMENTS

2012/0139899 A1\* 6/2012 Winchester ............. G06T 17/20
345/419
2014/0035934 A1\* 2/2014 Du .......................... G06T 17/20
345/474
2014/0176662 A1\* 6/2014 Goodman ............... H04W 4/21
348/14.07
2021/0027513 A1\* 1/2021 Choi ..................... G06V 40/172

FOREIGN PATENT DOCUMENTS

| CN | 105657323 A | 6/2016 |
|---|---|---|
| CN | 108230431 A | 6/2018 |
| CN | 109241810 A | 1/2019 |
| CN | 109840016 A | 6/2019 |
| CN | 110213521 A | 9/2019 |
| CN | 110278140 A | 9/2019 |
| CN | 113766168 A | 12/2021 |
| KR | 20110025720 A | 3/2011 |
| KR | 20200109634 A | 9/2020 |
| WO | WO 2011027475 A1 | 3/2011 |

OTHER PUBLICATIONS

Tencent Technology, IPRP, PCT/CN2022/088332, Nov. 21, 2023, 6 pgs.
Tencent Technology, ISR, PCT/CN2022/088332, Jul. 20, 2022, 3 pgs.

\* cited by examiner

First picture

Second picture

INTERACTION PROCESSING METHOD AND APPARATUS, TERMINAL AND MEDIUM

CROSS-REFERENCE TO RELATED APPLICATIONS

This application is a continuation application of PCT Patent Application No. PCT/CN2022/088332, entitled "AN INTERACTIVE PROCESSING METHOD, DEVICE, TERMINAL AND MEDIUM" filed on Apr. 22, 2022, which claims priority to Chinese Patent Application No. 202110606182.7, filed with the State Intellectual Property Office of the People's Republic of China on May 31, 2021, and entitled "INTERACTION PROCESSING METHOD AND APPARATUS, TERMINAL AND MEDIUM", all of which are incorporated herein by reference in their entirety.

FIELD OF THE TECHNOLOGY

This application relates to the field of computer technologies, and more particularly to an interaction processing method and apparatus, a terminal and a medium.

BACKGROUND OF THE DISCLOSURE

With rapid development of science and technology, multiple users in different places can conduct online sessions through an Internet. For example, multiple users may initiate an online video session through an Internet. Video sessions are widely used for their convenience, fastness, simplicity and the like.

In some video session scenarios, a camera acquires and transmits captured images containing real images of users, so that the real images of all the users are displayed in screens of terminals used by all the users participating in a video session. In some cases, users may be reluctant to present their real images in a video session, but may be more concerned about their privacies, so how to improve a privacy of a video session becomes a hot issue.

SUMMARY

Embodiments of this application provide an interaction processing method and apparatus, a terminal and a medium, which can replace a real image of a user with a virtual image to participate in a video session and improve data transmission efficiency while protecting user privacy.

An embodiment of this application provides a method performed by a computing device acting as a target terminal in a video session, the method:
- displaying, by the target terminal, a video session interface, the video session interface including an image display region for displaying images associated with one or more users participating in the video session;
- displaying, by the target terminal, a target virtual image of a user of the target terminal in the image display region;
- controlling, according to movement information of the user captured by the target terminal, the target virtual image displayed in the image display region to perform a target interaction action corresponding to the movement information of the user; and
- transmitting, by the target terminal, movement data of the target virtual image performing the target interaction action, to terminals of the other users of the video session, wherein the movement data renders the target virtual image to perform the target interaction action on the corresponding terminals.

An embodiment of this application provides a computing device including:
- a storage apparatus, configured to store a computer program; and
- a processor, configured to run the computer program stored in the storage apparatus to implement the above processing method.

An embodiment of this application provides a non-transitory computer-readable memory which stores a computer application program, which, when executed, implements the above processing method.

An embodiment of this application further provides a computer program product or a computer program, the computer program product or the computer program including computer instructions stored in a computer-readable memory. The processor of the terminal reads the computer instructions from the computer-readable memory, and executes the computer instructions, so that the terminal implements the above interaction processing method.

DESCRIPTION OF EMBODIMENTS

Figure 1A:
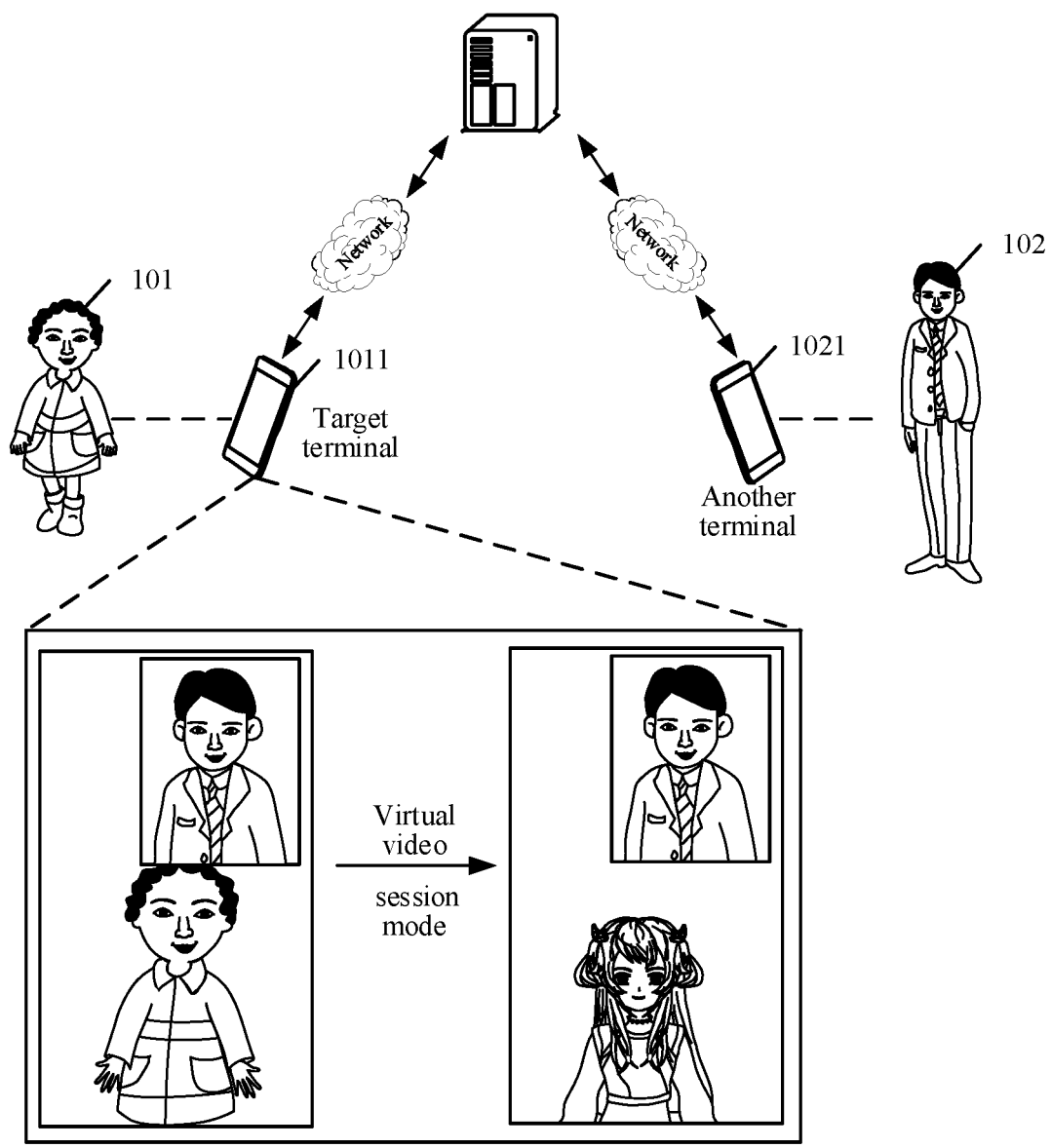
FIG. 1a shows a schematic diagram of a social session scenario according to some embodiments of this application.

The technical schemes in the embodiments of this application will be clearly and completely described below with reference to the drawings in the embodiments of this application, and it is obvious that the described embodiments are only a part of the embodiments of this application, but not all of them. Based on the embodiments of this application, all other embodiments obtained by those ordinarily skilled in the art without creative effort shall fall within the protection scope of this application.

The embodiments of this application involve a virtual image which may refer to: a virtual image used by a user to represent the user. The image may be a fictitious model (such as a cartoon model which does not really exist, an animation model, or the like) or a real model (such as a person model which is similar to a real person but is displayed in a screen of a terminal, or the like). Common virtual images may include, but are not limited to: a virtual person image (such as a cartoon figure image, an animation figure image, an anime image, etc.), a virtual animation image (such as a cartoon animal image, various object images, etc.), etc. For convenience of explanation, the following takes the virtual person image as an example for description. In a process of using a terminal, using a virtual image can improve a user's sense of substitution for a virtual image, so that the user is more immersed in operations. For example, in a video session scenario (such as a video call scenario and a video conference scenario), replacing a user with a virtual image to participate in a video session and simulating real-person interactions can improve a sense of immersion of a video session object. Video sessions may include an individual video session and a group video session. There are two users participating in the individual video session, and there are three or more users participating in the group video session. Embodiments of this application are not limited to types of video sessions, which is particularly stated here.

Based on this, an embodiment of this application provides an interaction processing scheme, which can replace, in a video session, a target session object with a target virtual image to participate in a video session, so as to fast displaying the target virtual image in a video session interface. In addition, movement information of the target session object may also be acquired, and the target virtual image is controlled, according to the movement information, to flexibly follow the target session object to perform a target interaction action, so as to realize participation in a video session through the target virtual image. Using the target virtual image to simulate real-person interactions can avoid displaying a real image of the target session object in the video session, to protect an image privacy of the target session object.

The above-mentioned interaction processing scheme may be performed by target terminals. The target terminals herein may include, but are not limited to: a smart phone, a tablet, a laptop, a desktop, and other terminal devices. An application program configured to perform the interaction processing scheme may be deployed in the target terminals. The application program may include but is not limited to: an Instant Messaging (IM) application program, a content interaction application program, and the like. The IM application program refers to an Internet-based instant messaging and social interaction application program. The IM application program may include, but is not limited to: QQ, WeChat, Enterprise WeChat, a map application program containing a social interaction function, a game APP, and the like. The content interaction application program refers to an application program capable of realizing content interactions, and may be, for example, e-bank, microblog, memories, news, and the like. In this way, a target user can open and use the application program deployed in the target terminal for a video session.

A video session scenario of the interaction processing scheme in an embodiment of this application is exemplarily described below with reference to FIG. 1*a*. As shown in FIG. 1*a*, a video session in the video session scenario is a video session of an IM application, a video session of a video conference, and other related video sections which perform communication via a video. Video session objects (namely, users participating in a video session) include a target user 101 (namely, a user of a target terminal) and other users 102 (such as friends and colleagues of the target user, and strangers). A video session interface may be displayed both on a terminal screen of a target terminal 1011 used by the target user 101 and on other terminals 1021 used by other users 102. The video session interface 103 may contain: one or a combination of two of a virtual image corresponding to the target user 101 and virtual images corresponding to other users 102. The video session interface as shown in FIG. 1*a* contains the virtual image corresponding to the target user 101 and a real image of another user 102. When the video session interface contains the virtual image corresponding to the target user 101, the above-mentioned target virtual image may refer to the virtual image corresponding to the target user 101, and the target user 101 refers to the target session object. By the same reasoning, when the video session interface contains both the virtual image corresponding to the target user 101 and the virtual image corresponding to another user 102, (1) when acquired movement information is movement information of the target user 101, the target virtual image controlled, according to the movement information, to perform the target interaction action refers to the virtual image corresponding to the target user 101. On the contrary, (2) when the acquired movement information is movement information of another user 102, the target virtual image controlled, according to the movement information, to perform the target interaction action refers to the virtual image corresponding to another user 102. For convenience of explanation, in this embodiment of this application, that the target session object is taken as the target user 101 and the target virtual image is taken as the virtual image corresponding to the target user 101 is taken as an example to describe subsequent relevant contents. This is stated here.

Figure 1B:
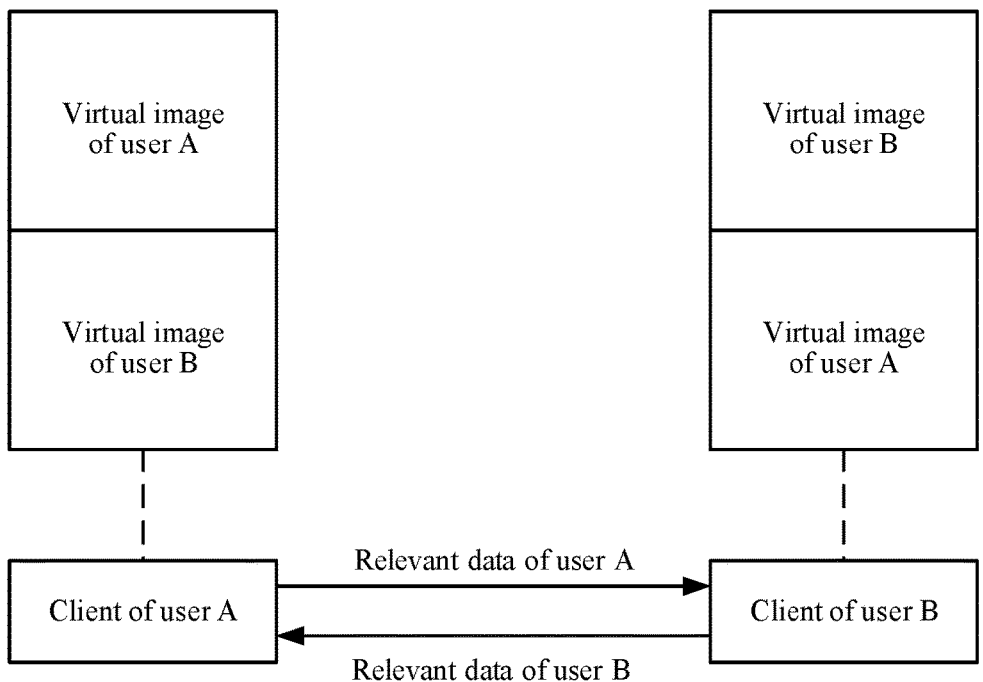
FIG. 1B shows a schematic diagram of a data transmission according to some embodiments of this application.

In this embodiment of this application, controlling the target virtual image to perform the target interaction action by means of rendering the target virtual image, instead of displaying a real image of the target session object in the image display region. Based on this, in this embodiment of this application, it is not necessary to transmit images about video session objects collected by a camera. The images include multiple frames of environment images of an environment captured by the camera. By only means of transmitting detected relevant data (such as face data and body data) about the video session objects, the virtual image that performs the target interaction action can be obtained, in a peer device, by rendering according to the relevant data. The transmission of only the relevant data of the video session objects can reduce a data transmission amount and improve data transmission efficiency compared with transmission of images. The above-mentioned flow diagram of transmitting relevant data of a video session object and obtaining, in a peer device, a target virtual image by rendering according to the relevant data of the video session object may be shown in FIG. 1B.

This embodiment of this application can also be combined with a blockchain technology, specifically as follows: The target terminal configured to implement the interaction processing scheme may be a node device in a blockchain network. The target terminal may post the collected movement information (such as limb information and face information) of the target session object to the blockchain network, and records, on a blockchain, relevant data (a type and information of the target interaction action) of the target interaction action controlled to be performed by the target virtual image according to the movement information. In this way, the collected movement information of the target session object can be prevented from being tampered in a transmission process, and each target interaction action performed by the target virtual image can also be effectively traced. In addition, the movement information is stored in the form of a block, so that distributed storage of the movement information may be implemented.

Based on the above-mentioned interaction processing scheme, an embodiment of this application provides a more detailed interaction processing method. The interaction processing method provided in this embodiment of this application will be described below with reference to the accompanying drawings.

Figure 2:
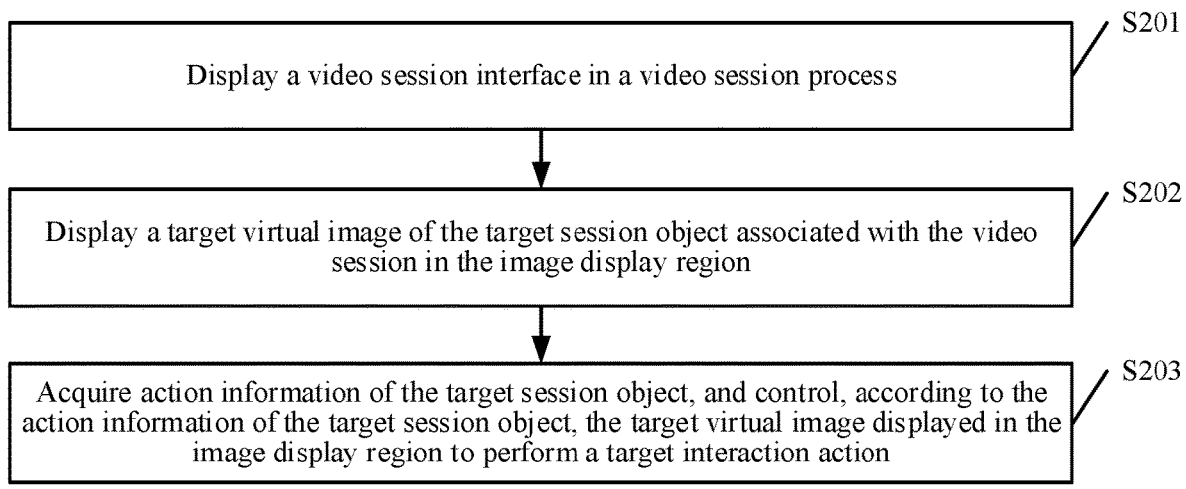
FIG. 2 shows a flow diagram of an interaction processing method according to some embodiments of this application.

Referring to FIG. 2, FIG. 2 shows a flow diagram of an interaction processing method according to some embodiments of this application. The interaction processing method may be implemented by a target terminal. As shown in FIG. 2, the interaction processing method may include, but is not limited to, steps S201-S203.

S201: Display a video session interface in a video session. When a video session object (namely, any user participating in a video session) opens and uses a video session function provided by a target application program (namely, any application program having a video session function), the target application program may display the video session interface corresponding to the video session. The video session interface may be used for presenting images of various video session objects participating in the video session, in particular, presenting the video session objects by means of presenting an environment image containing the video session objects. The environment image may be obtained by capturing an environment, and specifically collected, using a camera configured in the target terminal, from the environment in which a target session object is currently located. A process of capturing the environment image by the camera is performed after the camera is turned on in a video session scenario. If the camera of the terminal used by a certain video session object is not turned on in the video session scenario, only a configuration image (such as a user's ChatHead and a blank image) of the video session object is displayed in the video session interface. Specifically, the video session object may turn on the camera of the target terminal by means of triggering a camera option contained in the video session interface, which will not be described in detail herein. Recognizing a video session object contained in an environment image may be realized on the basis of Artificial Intelligence (AI). AI is a theory, method, technology and application system that uses a digital computer or a machine controlled by a digital computer to simulate, extend and expand human intelligence, sense an environment, acquire knowledge and use the knowledge to obtain an optimal result. The recognition can be specifically realized on the basis of Computer Vision technology (CV) under an artificial intelligence technology. The CV technology generally includes common biological feature recognition technologies such as face recognition and fingerprint recognition.

Figure 3A:
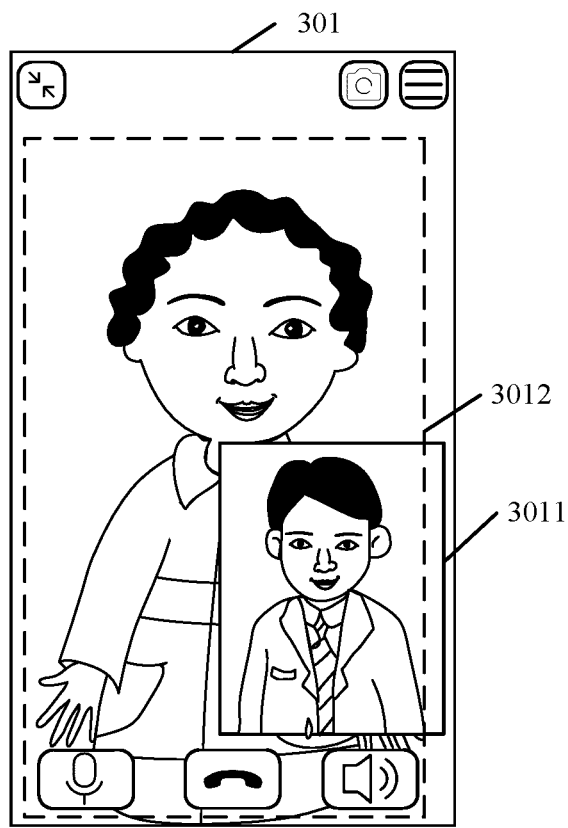
FIG. 3a shows a schematic diagram of a video session interface according to some embodiments of this application.

An example in which a video session is an individual video session is used. An exemplary video session interface may be seen in FIG. 3a. As shown in FIG. 3a, a video session interface 301 may be used for displaying environment images corresponding to various users participating in a video session, specifically as follows: The video session interface 301 includes an image display region used for displaying a video session object. One image display region is used for displaying an environment image corresponding to one video session object. As previously described, the video session object includes various video session objects participating in the individual video session. In this way, the video session interface 301 shown in FIG. 3a contains two image display regions: an image display region 3011 and an image display region 3012, respectively. The two image display regions are respectively used for displaying environment images corresponding to different video session objects participating in the individual video session. The two image display regions may be displayed in an overlapping manner in the video session interface. As shown in FIG. 3a, one image display region with a smaller display area is displayed over the other image display region with a larger display area. Or the two image display regions may be displayed side by side (or in parallel, diagonally, and the like) in the video session interface. For convenience of explanation, the following will make a description by using an example in which two image display regions are displayed in an overlapping manner in an individual video section and multiple image display regions are displayed side by side in a group video session. This is particularly stated here.

Figure 3B:
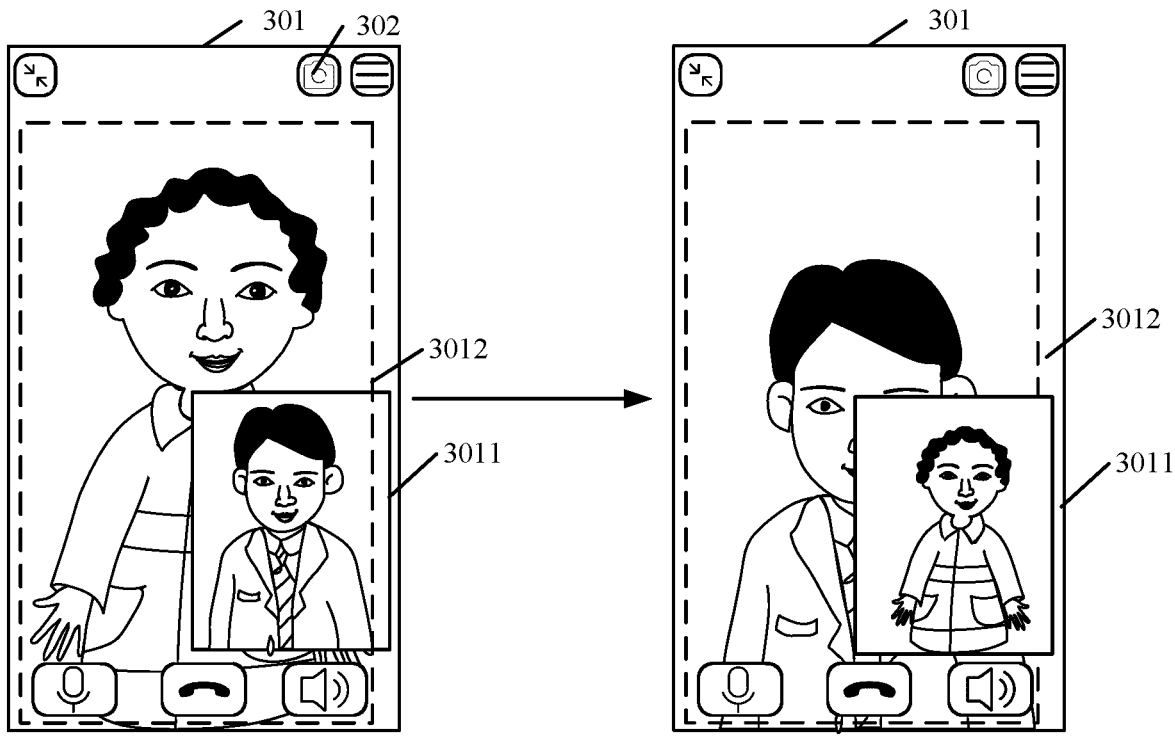
FIG. 3b shows a schematic diagram of switching displaying of environment images contained in image display regions according to some embodiments of this application.

Still referring to FIG. 3b, this embodiment of this application supports switching displaying of the environment images contained in the two image display regions. For example: Assuming that the environment image of a first video session object is displayed in the image display region 3011 and the environment image of a second video session object is displayed in the image display region 3012, this embodiment of this application supports switching the environment images contained in the two image display regions. That is, the environment image of the second video session object is displayed in the image display region 3011, and the environment image of the first video session object is displayed in the image display region 3012. In a specific implementation, the video session objects participating in the video session are supported to switch the displaying of the environment images contained in the image display regions on terminal screens used by the video session objects. With reference to FIG. 3b, it is assumed that the environment image corresponding to the target session object is displayed in the image display region 3012, and the environment image corresponding to another video session object is displayed in the image display region 3011. A switching option 302 is also displayed in the video session interface. When the switching option 302 is triggered, it indicates that the target session object intends to switch the displaying of the environment image displayed in the image display region, namely, to display the environment image corresponding to the target session object in the image display region 3011 and display the environment images of another video session object in the image display region 3012. Of course, in addition to triggering the switching option to switch the displaying of the environment images contained in the image display regions, the displaying of the environment images contained in the image display regions can also be switched by means of user's gesture and the like. For example, a video session object is supported to drag the environment image displayed in one image display region to the other image display region, thereby switching the displaying of the environment images contained in different image display regions. For convenience of explanation, the following uses an example, in which the environment image corresponding to the target session object is displayed in the image display region 3011, for description. This is particularly stated here.

Attribute information such as a display area, shape and display region of the image display region on the video session interface is not unchanged. This embodiment of this application supports the target session object to adjust the attribute information of all or part of the image display regions on the target terminal. For example, the target session object is supported to drag, on the video session interface, any image display region from a first position to a second position (for example, another position, different from the first position, on the video session interface). For another example, the target session object is supported to adjust any image display region from a square shape to a round shape on the video session interface. Specifically, any shape may be selected from various of pre-configured shapes, or a shape may be artificially created by the target session object. For yet another example, the target session object is supported to perform a gesture of "tapping with two fingers" in the video session interface to enlarge the image display region with a relatively small display area and narrow the image display region with a relatively large display area, and the like.

S202: Display a target virtual image of the target session object associated with the video session in the image display region. This embodiment of this application supports switching from a real video session to a virtual video session in the video session scenario. The so-called real video session means that: Video session objects participating in a video session all participate in the video session by real images. At this time, the real images of the video session objects collected by a camera are displayed in image display regions. The so-called virtual video session means that: All or part of video session objects participating in a video session use virtual images to participate in the video session. For example, the target session object uses the target virtual image to participate in the video session, and at this time, the virtual image is displayed in the image display region. This manner of participating in a video session by video session objects using virtual images protects an image privacy of the video session objects.

Figure 4:
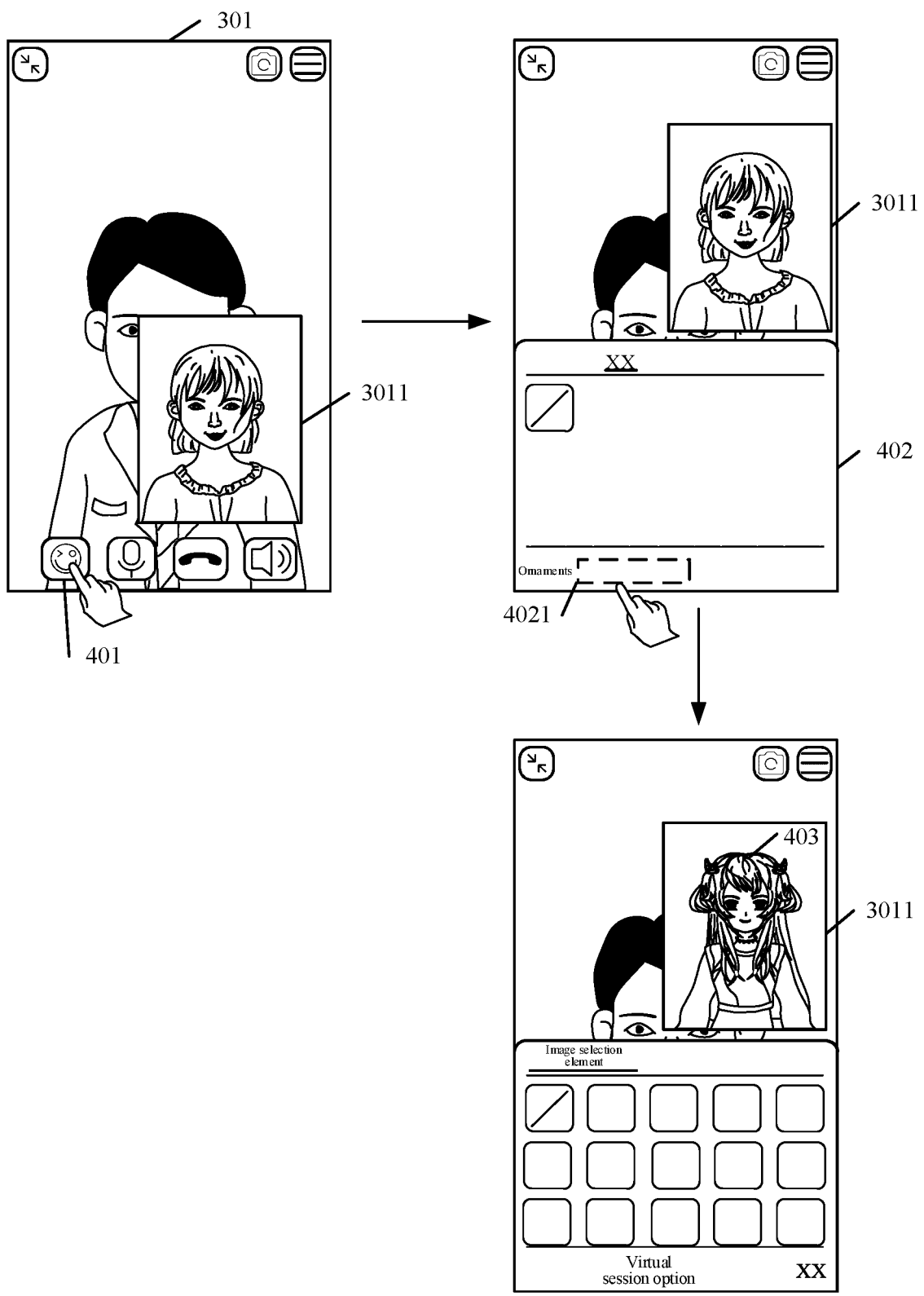
FIG. 4 shows a schematic diagram of switching a virtual video session mode according to some embodiments of this application.

In a specific implementation, when the target session object performs a virtual session operation on the video session interface, it is determined to enable a virtual video session mode. In the virtual video session mode, the real image of the target session object will not be displayed in the image display region used for displaying the environment image of the target session object on the video session interface, but the target virtual image that replaces the target session object is displayed. The virtual session operation may include, but is not limited to: an operation generated during triggering of a virtual session option; an operation generated when a shortcut gesture operation (such as a double-click operation, a single-click operation and a drag operation) is performed on the video session interface; or the like. The following mainly describes an example of performing the virtual session operation by means of triggering the virtual session option. Specifically, the virtual session option is displayed on the video session interface, or any option contained in the video session interface includes the virtual session option. When the virtual session option is triggered, it may be determined that the virtual session operation has been performed. With reference to FIG. 4, the above-mentioned process of performing the virtual session operation by means of triggering the virtual session option is briefly described by using an example in which any option contained in the video session interface includes the virtual session option. As shown in FIG. 4, any option 401 (such as an animation option and an expression option) is displayed in the video session interface. When any option 401 is triggered, an option window 402 is output. The option window 402 contains a virtual session option 4021. If the virtual session option 4021 is triggered, it is determined that the target session object performs a virtual session operation, and a virtual video session mode is enabled. At this time, the target virtual image, such as a target virtual image 403, configured for the target session object may be displayed in the image display region 3011 corresponding to the target session object.

There may be various manners for determining a target virtual image that represents the target session object to participate in the video session. For example, the target virtual image is configured by a system, or is independently selected by the target session object. The following describes in more detail different manners for determining a target virtual image.

(1) A target virtual image is configured by a system. In a specific implementation, when the target terminal initiates a video session, a target image obtained by capturing an environment may be acquired. The target image may include a real image of the target session object (namely, a target user). Feature recognition processing is performed on the target session object in the target image to obtain a recognition result. A virtual image matching the recognition result is allocated to the target session object, and the virtual image matching the recognition result is determined as the target virtual image. The feature recognition may be recognizing the face of the target session object, which is not limited in this embodiment of this application. In other words, after the virtual video session mode is enabled, the target image captured by the camera can be acquired, and image recognition processing is performed on the target image to obtain a feature recognition result of the target session object. A virtual image matching the feature recognition result is then selected from a virtual image library according to the feature recognition result. The virtual image is determined as the target virtual image. For example: The feature recognition is performed on the face of the target virtual image to obtain a face recognition result indicating that the target session object is a user with beards, and the selected target virtual image matching the face recognition result may be a virtual image with beards. For another example, the feature recognition is performed on the head of the target virtual image to obtain a feature recognition result indicating that the target session object is a user wearing a hat, and the selected target virtual image matching the feature recognition result may be a virtual image wearing a hat.

(2) A target virtual image is independently selected by the target session object. In a specific implementation, an image selection window may be displayed in the terminal screen. The image selection window includes an image selection element. A reference virtual image is displayed in a reference display region in response to a trigger operation performed on the image selection element, and candidate virtual images are displayed in the image selection window. The reference virtual image is updated, in response to an image selection operation performed on the candidate virtual images, to be displayed as a target candidate virtual image selected by the image selection operation. It is determined, in response to a virtual image confirm operation, that the target candidate virtual image is the target virtual image. The so-called "response" corresponds to "request". For example, when there is a trigger operation, in the image selection window, performed on the image selection element, a request for triggering the image selection element is generated in a background. At this time, a response may be made to the request, that is, to the trigger operation performed on the image selection element. In addition, the target virtual image may include a comic person image, an animal image, an object image, or the like, thereby enriching selectivity of video session objects.

Figure 5:
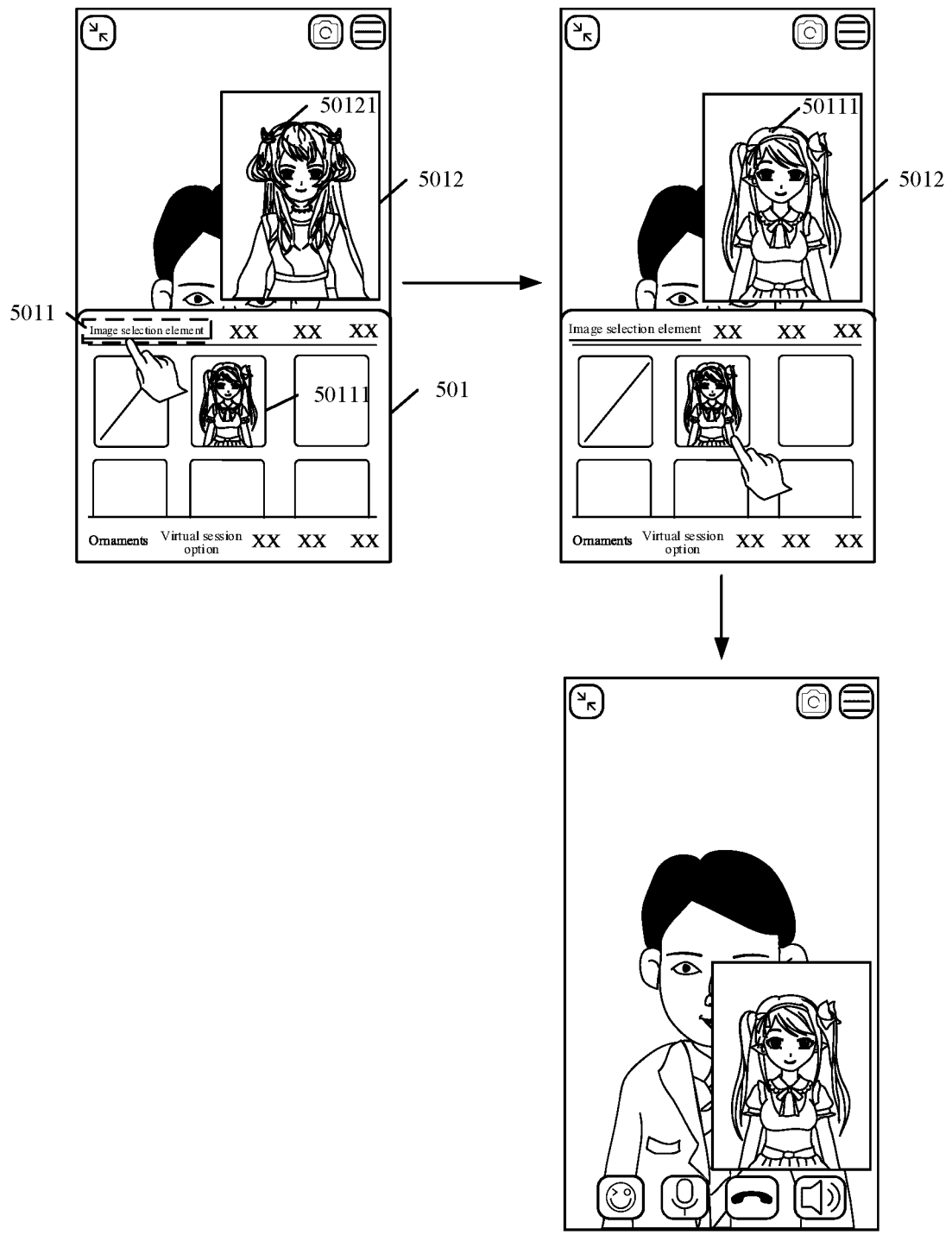
FIG. 5 shows a schematic diagram of selecting a target virtual image according to some embodiments of this application.

The following describes the above implementation for independently selecting the target virtual image by the target session object with reference to FIG. 4 and FIG. 5: First, after the virtual session option 4021 in the option window 402 is triggered, it is indicated that the virtual video session mode is enabled, an image selection window 501 may be output. The image selection window 501 contains an image selection element 5011. The image selection window 501 can be the option window 402, but information displayed in the window is related to a virtual image. Secondly, when the image selection element 5011 is triggered, candidate virtual images are displayed in the image selection window 501. There is one or more candidate virtual images, such as a candidate virtual image 50111. A reference virtual image 50121 is displayed in a reference display region 5012. The reference display region 5012 may refer to the image display region 3011 or a region dedicated to display a reference virtual image. The reference virtual image 50121 may be a default virtual image or a virtual image used by the target session object before triggering the image selection element. Next, in response to the image selection operation performed on the candidate virtual images (for example, the candidate virtual image 50111), the reference virtual image 50121 is updated, in the reference display region 5012, to be displayed as the target candidate virtual image (for example, the candidate virtual image 50111) selected by the image selection operation, so that the target session object may preview the appearance and actions of the selected target candidate virtual image in the reference display region, so as to meet a preview requirement of the target session object for virtual images. Finally, when there is an image confirm operation (such as a gesture operation for the reference display region, or a click operation for a confirm option), which means that the target candidate virtual image displayed in the reference display region is confirmed as the target virtual image, the target candidate virtual image is displayed as the target virtual image in the image display region of the video session interface, and at this time, the target session object may conduct, by using the target candidate virtual image, a session with another video session object participating in the video session.

When any option (or element) in the image selection window is selected, the selected option may be highlighted to prompt the target session object that information displayed in the current image selection window is related to the selected option. For example, when the virtual session option 4021 in the image selection window is selected, the virtual session option 4021 may be highlighted in the image selection window (for example, a brightness of the virtual session option 4021 is higher than that of other options, and a transparency of the virtual session option 4021 is lower than that of other options) to prompt the target session object that the candidate virtual image is displayed in the current image selection window. Furthermore, since a display area of the terminal screen is limited, part of the candidate virtual images may be hidden. In this way, the image selection window may include a sliding axis. The hidden candidate virtual images may be slidably displayed by operating the sliding axis. Of course, in addition to slidably displaying the candidate virtual images in the image selection window via the sliding axis, the candidate virtual images may also be slidably displayed by pressing to slide any position of the image selection window, which is not limited in this embodiment of this application.

It is understood that images displayed in the image display region are not the same according to different moments when the image selection operation is performed and the camera is turned on. Specifically, in a video session scenario, when the target session object does not turn on the camera, when the target session object performs the image selection operation and selects the target virtual image, the camera of the target terminal may be automatically triggered to be turned on, and at this time, the target virtual image selected by the target session object is displayed in the image display region. If the target session object has turned on the camera, but does not select the target virtual image and does not enable the virtual video session mode, the environment image obtained by capturing, by the camera, the environment in which the user is currently located may be displayed in the image display region at this time. After the target session object performs the image selection operation, the environment image displayed in the image display region is replaced with an image containing the target virtual image. If the target session object has turned on the camera, but does not select the target virtual image and has enabled the virtual video session mode, the virtual image configured by the system may be displayed in the image display region. After the target session object performs the image selection operation, the virtual image displayed in the image display region is replaced with the target virtual image.

Figure 6:
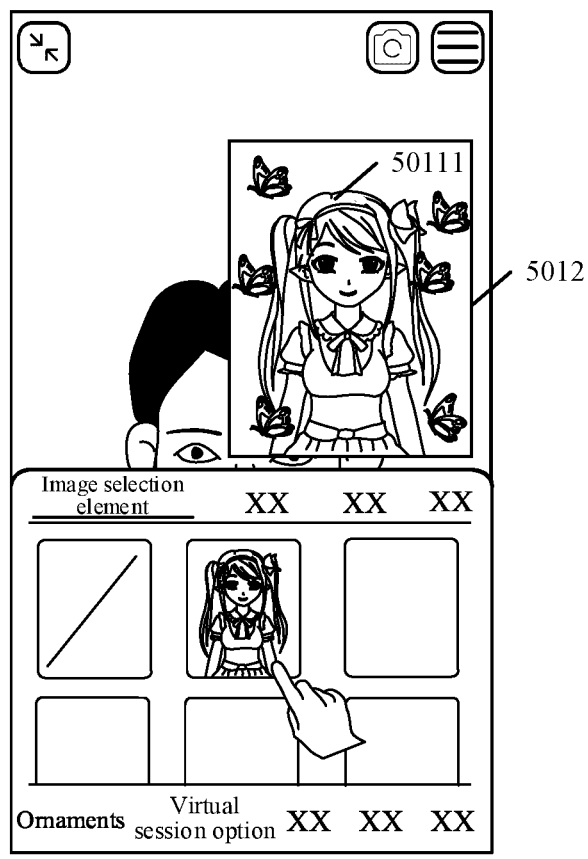
FIG. 6 shows a schematic diagram of displaying a background image while selecting a target virtual image according to some embodiments of this application.

In addition, a background image is also displayed in the image display region contained in the video session interface. A more realistic session environment can be created by means of allocating a background to the target virtual image. Each candidate virtual image displayed in the image selection window may be matched with a default background image, so that the candidate virtual image may be better fused with the background. In a specific implementation, as shown in FIG. 5, when the target session object selects any one of the candidate virtual images in the image selection window, the background image allocated to the candidate virtual image may be displayed when the candidate virtual images is displayed in the reference display region. An exemplary schematic diagram of displaying a background image while selecting the target virtual image can be seen in FIG. 6. As shown in FIG. 6, when a candidate virtual image in the image selection window is selected, the background image is displayed in the reference display region 5012 in addition to displaying the candidate virtual image 50111. For example, the background image contains many flying butterflies. In this implementation, the background images allocated to the various candidate virtual images displayed in the image selection window can be displayed together in the region for displaying the candidate virtual images, so as to facilitate the target session object to select the target virtual image on the basis of both the candidate virtual images and the background images, and improve a video session experience of the target session object.

Figure 7:
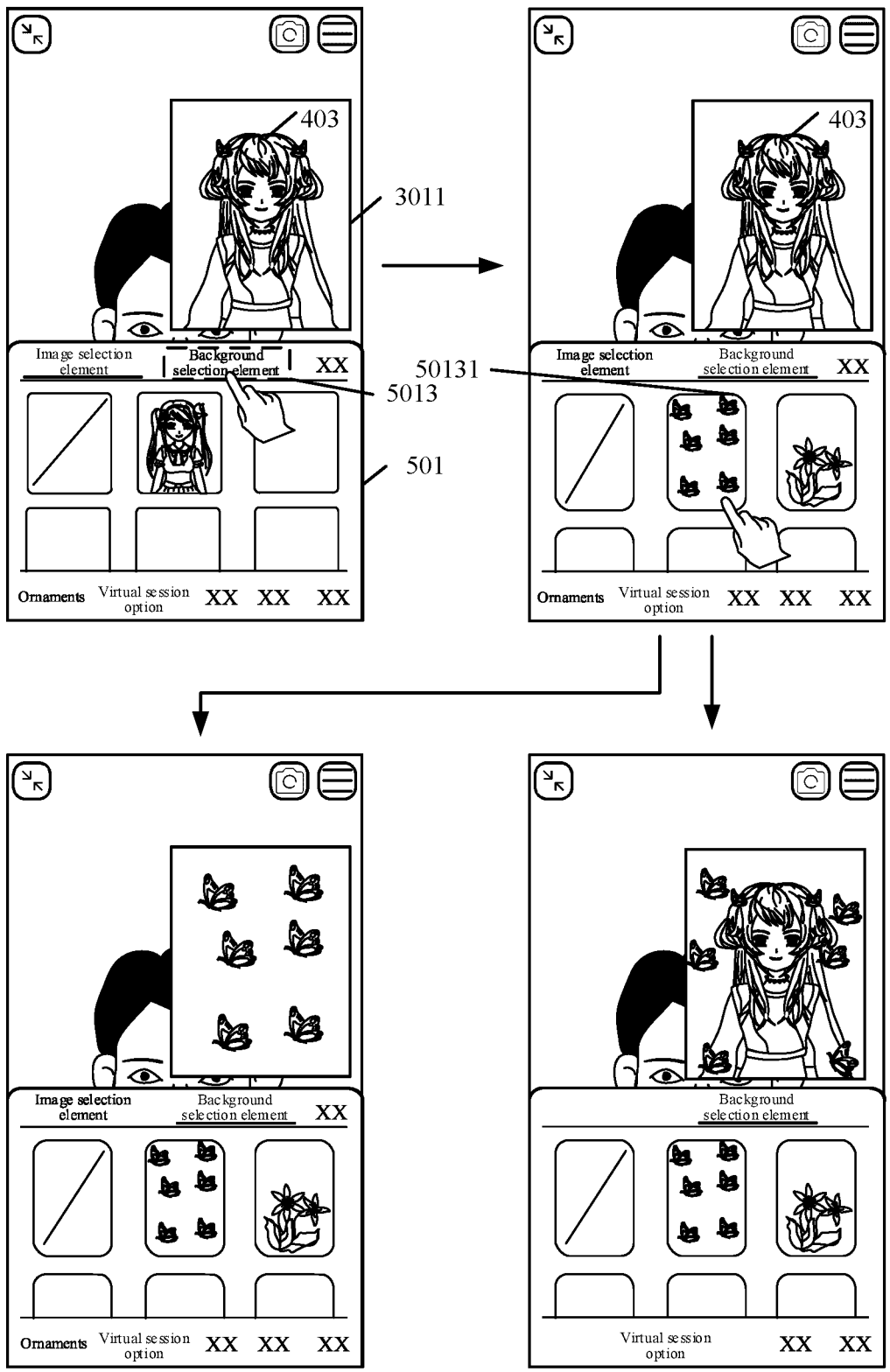
FIG. 7 shows a schematic diagram of selecting a background image in an image selection window according to some embodiments of this application.

In addition to the above-mentioned description, in addition to selecting the background image by means of selecting the virtual image, this embodiment of this application also supports the target session object to freely select the background image according to a preference of the target session object. In other words, the target session object may independently select the background image. In a specific implementation, a background selection element is displayed in the image selection window. Candidate background images are displayed in the image selection window in response to a user operation performed on the background selection element. A target candidate background image selected by the background selection operation is displayed in the reference display region in response to a background selection operation performed on the candidate background images. The target candidate background image is set as a background image of the image display region in response to a background image confirm operation. An exemplary schematic diagram of selecting a background image in an image selection window can be seen in FIG. 7. As shown in FIG. 7, the image selection window 501 contains a background selection element 5013. When the background selection element 5013 is selected, the candidate background images are switched to be displayed in the image selection window 501. There is one or more candidate background images, such as a candidate background image 50131. In response to the background selection operation performed on the candidate background images, a target candidate background image selected by the background selection operation is displayed in the reference display region. Only the target candidate background image may be displayed in the reference display region, or the virtual image and the target candidate background image may be simultaneously displayed in the reference display region, which is not limited in this embodiment of this application. In response to the background image confirm operation, when it is indicated that the candidate background image displayed in the reference display region is confirmed as the background image of the image display region, the video session interface is displayed, and the selected target candidate background image is displayed in the image display region contained in the video session interface.

This embodiment of this application supports selecting the background image by the target session object only after selecting the target virtual image, thus helping better fuse the target virtual image with the background. In one implementation, when the target session object does not select the target virtual image, the background selection element in the image selection window is set to be non-selectable, namely, the background selection element cannot be triggered. In this way, it prompts the target session object to select the target virtual image first. On the contrary, when the target session object has selected the target virtual image, the background selection element is set to be selectable, that is, the background selection element supports to be clicked. Of course, when the target session object selects the target virtual image again after selecting the background image, the background image selected by the target session object is displayed during the selection of the target virtual image, instead of switching to display the background image corresponding to the target virtual image.

In addition, this embodiment of this application also supports configuring a sound effect for the target session object to further enrich video session manners. The sound effect configured for the target session object may match the target virtual image. In this implementation, when the target virtual image has been selected, it is determined to use a voice audio processing rule matching the target virtual image to perform simulation processing on a sound signal of the target session object received in the video session, so as to obtain the sound effect matching the target virtual image. The use of the sound effect matching the target virtual image for the video session improves an identity privacy of the target session object. Or the target session object selects a sound effect. In a specific implementation, a voice selection element is displayed in the image selection window. A candidate voice audio processing rule in the image selection window may be displayed in response to a selection operation performed on the voice selection element. It is determined, in response to a confirm operation performed on the candidate voice audio processing rule, that the candidate voice audio processing rule is a target voice audio processing rule, the target voice audio processing rule being used for performing simulation processing on a sound signal of the target session object received in the video session.

Figure 8:
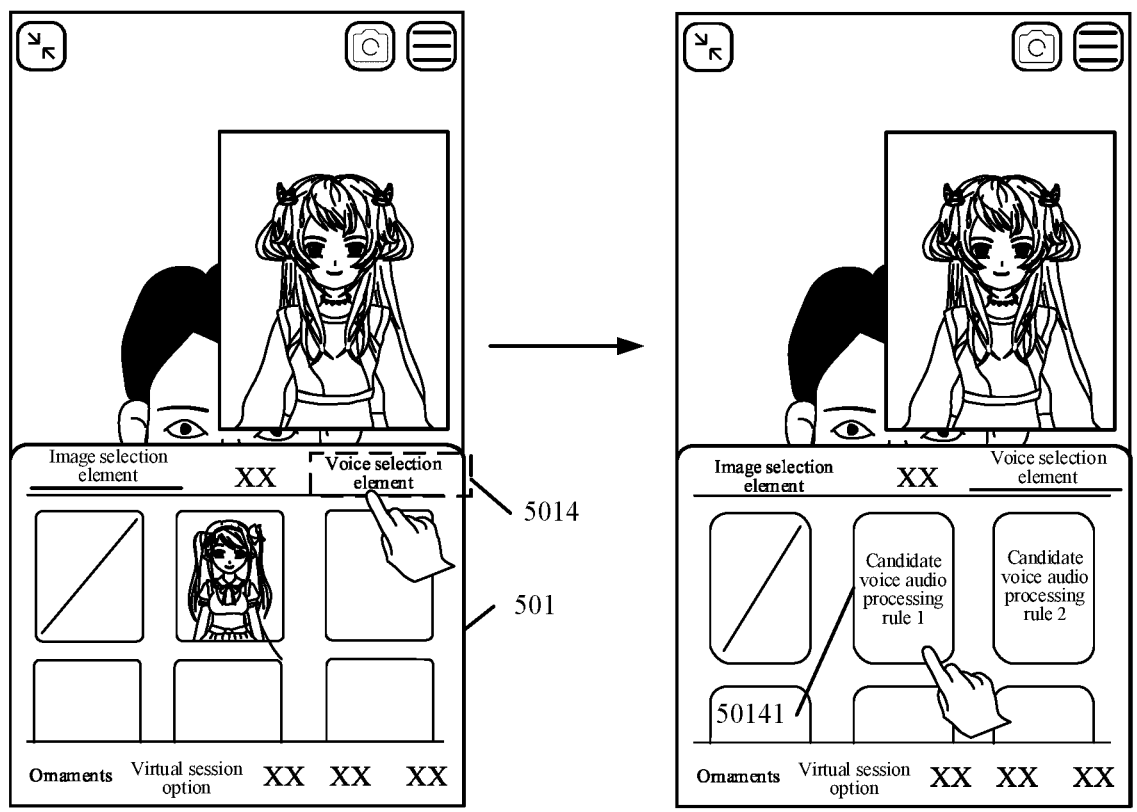
FIG. 8 shows a schematic diagram of selecting a voice audio processing rule according to some embodiments of this application.

The above implementation of selecting the voice audio processing rule can be seen in FIG. 8. As shown in FIG. 8, a voice selection element 5014 is contained in the image selection window 501. In response to a selection operation performed on the voice selection element 5014, one or more candidate voice audio processing rules, such as a candidate voice audio processing rule 50141, may be displayed in the image selection window. When any one of the candidate voice audio processing rules is selected, the selected candidate voice audio processing rule may be determined as a target voice audio processing rule. In this way, when an input sound signal of the target session object is subsequently collected, the target voice audio processing rule is used to perform the simulation processing on the sound signal, so that an output sound effect meets a requirement of the target session object, and an experience of the target session object participating in the video session is improved.

In summary, this embodiment of this application supports a video session object to freely select a background image, a virtual image and a sound effect, so as to meet personalized requirements of the video session object on the virtual image, the background image and the sound effect, and an interactivity of the video session object participating in the video session can be improved.

S203: Acquire movement information of the target session object, and control, according to the movement information of the target session object, the target virtual image displayed in the image display region to perform a target interaction action. In the virtual video session mode, the target virtual image may perform the target interaction action according to the movement information of the target session object. The target interaction action corresponds to an action performed by the target session object. In terms of a visual effect, the target virtual image follows the target session object to perform a corresponding action, and the target session object may conduct video sessions with other session objects by using the target virtual image.

The target interaction action performed by the target virtual image matches the collected movement information of the target session object. Matching here can be understood below: In one implementation, the target interaction action performed by the target virtual image is similar to an action indicated by the movement information. For example: If the movement information of the target session object is facial movement information, namely, when the movement information indicates that the face of the target session object performs an action, the target virtual image may be controlled to perform a facial interaction action. If the facial movement information of the target session object instructs: the target session object to wink with the right eye, the right eye of the target virtual image may be controlled to wink. As another example: If the movement information of the target session object is limb information, namely, when the movement information indicates that a limb of the target session object does an action, a target limb of the target virtual image is controlled to perform a limb action. If the limb action indicated by the limb information is: raising up the right hand of the target session object, the right arm of the target virtual image may be controlled to be raised up. As another example if the movement information of the target session object is position change information, namely, the movement information indicates that the position of the target session object changes, the target virtual image is controlled to perform a position change action in the image display region. If an action indicated by the position change information of the target session object is that: the target session object moves to the left along a horizontal direction, the target virtual image may be controlled to move to the left in the image display region.

In other implementations, there is a mapping relationship between the target interaction action performed by the target virtual image and the action indicated by the movement information. For example: if the movement information of the target session object is recognized as emotional information, a target facial resource in a mapping relationship with an emotion indicated by the emotional information may be used to replace the face of the target virtual image and displayed. At this time, a form (such as a facial form) presented by the target virtual image may not be the same as that presented by the target virtual image, but both convey the same emotion. If the emotional information of the target session object is laugh, a target facial resource in a mapping relationship with laugh may be used to replace the face of the target virtual image and displayed, so that an expression of the target virtual image after replacement displaying is laugh. For another example, when the emotional information of the target session object is anger, a facial resource (for example, a facial animation resource with fire on the eyes) in a mapping relationship with anger may be used to replace the face of the target virtual image and displayed, so that an expression of the target virtual image after replacement displaying is anger. The emotional information corresponding to the movement information can be determined by means of model recognition. Mapping relationships between emotions and facial resources can be pre-set, so as to facilitate the above-mentioned presentation of the face of the target virtual image and embody various relatively exaggerated emotions. The implementation process for controlling, according to the movement information of the target session object, the target virtual image to perform the target interaction action will be described in a later embodiment and will not be described in detail herein.

This embodiment of this application supports quitting the virtual video session mode, namely, changing from the virtual video session mode to a normal video session mode. In the normal video session mode, a real image of the target session object can be displayed in the image display region contained in a video session interface. In a specific implementation, the image selection window includes a quit option. The quit option in the image selection window as shown in FIG. 5 is a "clear" option at the first position in the image selection window. The video session interface is displayed in response to a click operation performed on the quit option. An environment image is displayed in the image display region contained in the video session interface, the environment image being obtained by capturing an environment. The environment image is sent to a peer device so that the peer device displays the environment image, the peer device referring to a device used by other users participating in the video session.

Figure 9:
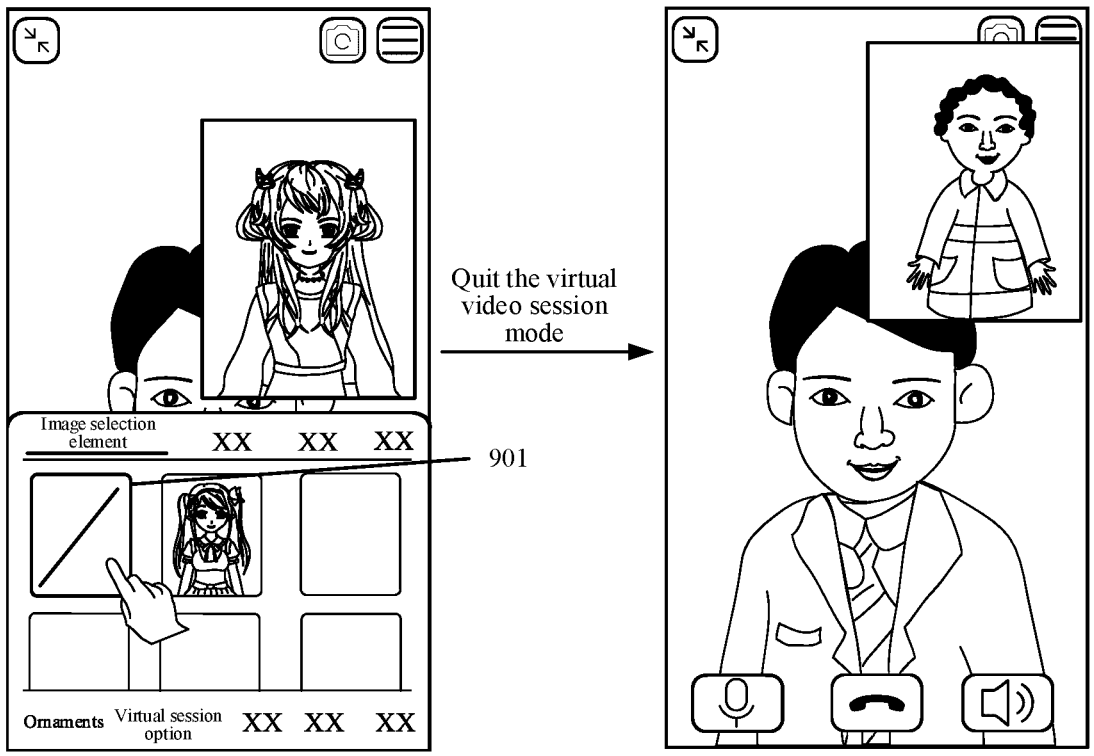
FIG. 9 shows a schematic diagram of quitting a virtual video session mode according to some embodiments of this application.

An implementation of quitting a virtual video session mode is described in conjunction with FIG. 9. As shown in FIG. 9, a quit option 901 is displayed in the image selection window 501. When the quit option 901 is selected, which indicates that the target session object intends to return to a normal video session mode from the virtual video session mode, the video session interface is displayed at this time, and an environment image captured by the camera is displayed in the image display region contained in the video session interface, and the environment image may contain a real image of the target session object. At the same time, the target terminal may also send the collected environment image to the peer device, so that the environment image corresponding to the target session object is also displayed in the image display region displayed by the peer device. Of course, the implementation of quitting the virtual video session mode does not only include the click operation performed on the option, and the quit option is also not necessarily displayed in the image selection window. For example, the quit option may also be directly displayed in the video session interface, which can facilitate the target session object to quickly switch a video session mode, and the operation is simple and convenient.

In this embodiment of this application, the target virtual image can be displayed in the video session interface of the video session, and the target virtual image is driven, according to movement information of the target session object, to perform the target interaction action, so that the target session object can participate in the video session by using the target virtual image. This manner of outputting the target virtual image in the video session interface can quickly display the target virtual image. In addition, the target virtual image can be used for representing the target session object to participate in the video session. Using a virtual image to simulate real-person interactions can avoid displaying a real image of the target session object in the video session, to protect an image privacy of the target session object.

Figure 10:
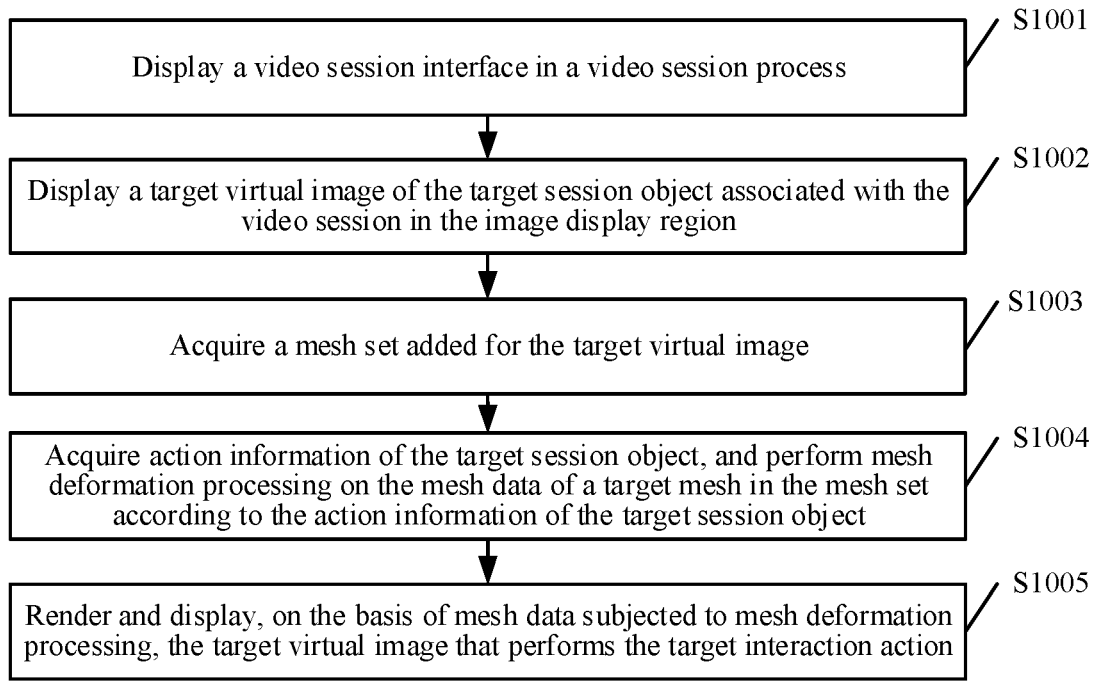
FIG. 10 shows a flow diagram of another interaction processing method according to some embodiments of this application.

Referring to FIG. 10, FIG. 10 shows a flow diagram of another interaction processing method according to some embodiments of this application. The interaction processing method may be implemented by a target terminal. As shown in FIG. 10, the interaction processing method may include, but is not limited to, steps S1001-S1005.

S1001: Display a video session interface in a video session.

S1002: Display a target virtual image of the target session object associated with the video session in the image display region.

Specific implementations of steps S1001-S1002 can refer to the relevant descriptions of the specific implementations of steps S201-S202 in the embodiment shown in FIG. 2, and will not be described in detail herein.

S1003: Acquire a mesh set added for the target virtual image.

S1004: Acquire movement information of the target session object, and perform mesh deformation on the mesh data of a target mesh in the mesh set according to the movement information of the target session object.

S1005: Render and display, on the basis of mesh data subjected to mesh deformation processing, the target virtual image that performs the target interaction action.

In steps S1003-S1005, the target virtual image provided by this embodiment of this application is two-dimensional (2D) virtual image. The 2D virtual image can be referred to as a two-dimensional virtual image. Any point on the two-dimensional virtual image can be represented by an x-axis and a y-axis, namely, the two-dimensional virtual image is a planar graph. This 2D virtual image has a relatively low requirement for configuration capability of the target terminal, and is convenient and fast to move. Target virtual image control efficiency can be improved when the 2D virtual image is used in a video session scenario. Furthermore, in order to enable the 2D virtual image to perform the target interaction action more realistically and naturally, a large number of 3D to 2D methods are also used in this embodiment of this application. Specifically: (1) Turning actions can be expressed through deformations of the face, head, hairs and other elements of the target virtual image, so that the target virtual image looks full and three-dimensional in a micro inching range. (2) When the head element or the body element swings, a physical elasticity of a real world is increased, such as swinging elasticities of the hair element and ornament elements, so that the target virtual image looks more realistic. (3) When the target virtual image does not perform any interaction action, a feeling of fluctuating of the body (such as the chest) during breathing can be added for the target virtual image, and an action of making the body swing slightly can be performed randomly, which makes the target virtual image more realistic.

In order to enable the 2D virtual image to follow the target session object to perform three-dimensional fluent actions and expressions, this embodiment of this application also creates grids for various object elements contained in the target virtual image. The grids corresponding to all the object elements contained in the target virtual image constitute the mesh set. One mesh corresponds to one object element, and any mesh is composed of at least three mesh vertices. The object elements may refer to single elements constituting the target virtual image. For example, the hairs of the target virtual image may be referred to as a hair element. The hair element is composed of a plurality of hair sub-elements (such as a tilted frisette element and an earlock element). As another example, an arm of the target virtual image may be referred to as a limb element, or the like. In order to improve the fineness and accuracy of the target interaction action performed by the target virtual image, this embodiment of this application supports that the mesh corresponding to one object element may include a plurality of sub-grids. In this way, part of the position of the object element corresponding to the mesh can be changed by controlling a certain sub-mesh of the grid. In addition, for convenience of explanation, in this embodiment of this application, a mesh corresponding to an object element that performs an interaction action is referred to as a target grid. This is stated here.

Figure 11A:
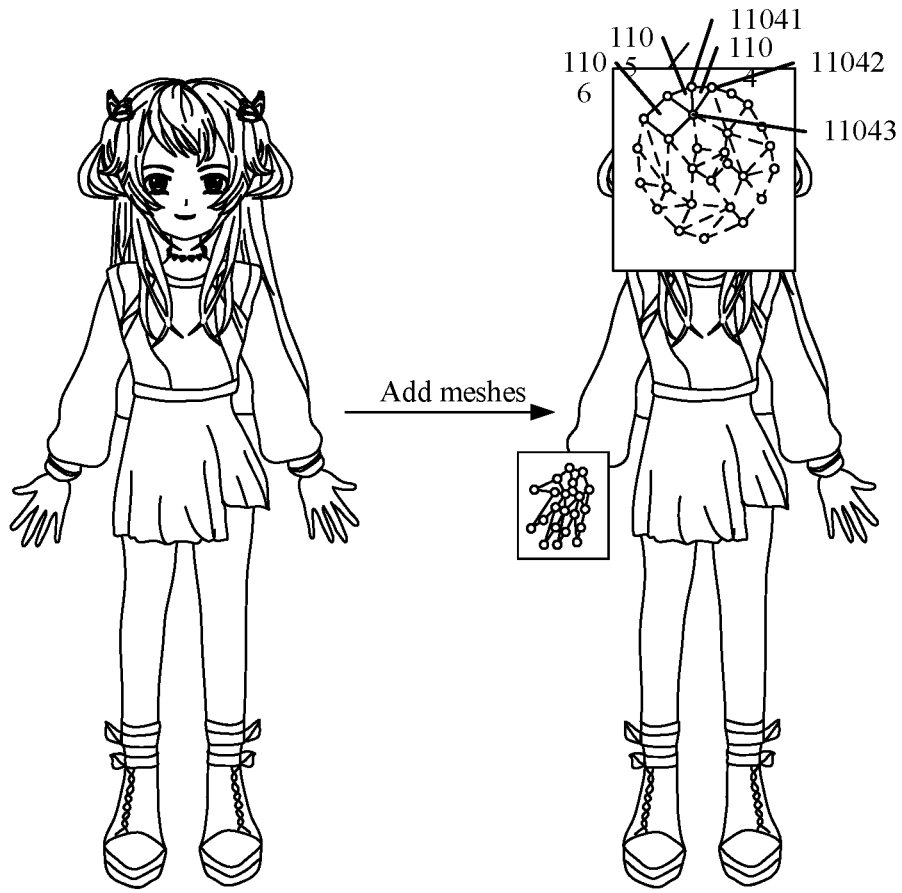
FIG. 11a shows a schematic diagram of adding grids for a target virtual image according to some embodiments of this application.

An exemplary schematic diagram of adding a mesh for a target virtual image can be seen in FIG. 11a. As shown in FIG. 11a, after grids are respectively added to the face element and the palm element of an original target virtual image shown in the first picture, a second picture after mesh adding can be obtained. The mesh corresponding to the face element of the target virtual image in the second picture includes a plurality of sub-meshes, and each sub-mesh is formed by connecting a plurality of mesh vertices. For example, the mesh corresponding to the face element includes a sub-mesh 1104, a sub-mesh 1105, a sub-mesh 1106, and the like. The sub-mesh 1104 includes three mesh vertices, respectively a mesh vertex 11041, a mesh vertex 11042 and a mesh vertex 11043. It is understood that FIG. 11a is merely an exemplary manner for adding the grids for the face element and the palm element of the target virtual image. In a practical application scenario, a quantity of sub-meshes contained in a grid, a number and distribution of mesh vertices, and the like may vary. This embodiment of this application does not limit the grids added for the target virtual image. This is stated here.

In a specific implementation, the mesh is driven by changing mesh data of any grid, so as to control the object element corresponding to the mesh in the target virtual object to perform a target interaction action. The mesh set corresponding to the target virtual image contains a plurality of grids and mesh data of the various grids. The mesh data of any mesh refers to state values of the various mesh vertices contained in the grid. The state value of any mesh vertex may refer to position information of the mesh vertex, a position relationship between the mesh vertex and other mesh vertices connected to the mesh vertex, or the like. When the various mesh vertices use different state values, the target virtual image rendered by using the mesh data performs different interaction actions. In this way, a target mesh can be driven to perform mesh deformation in real time by using the movement information of the target session object, so as to drive the corresponding object element in the target virtual object to perform the target interaction action, so that the 2D virtual image can also achieve various two-dimensional patch motion effects, and the target virtual image can flexibly follow the target session object to perform interaction actions.

Figure 11B:
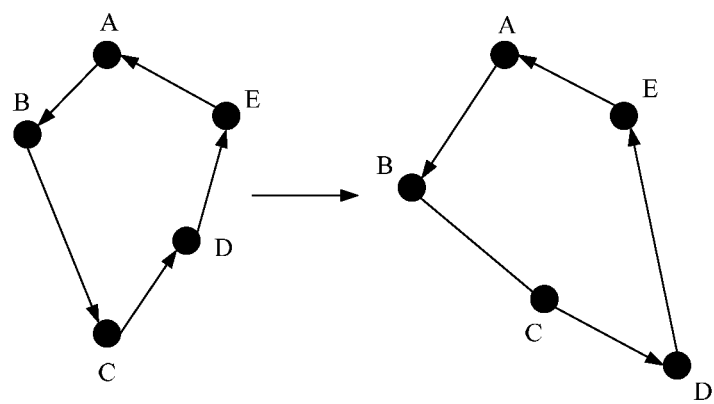
FIG. 11b shows a schematic diagram of performing mesh deformation on mesh data of a mesh according to some embodiments of this application.
Figure 11C:
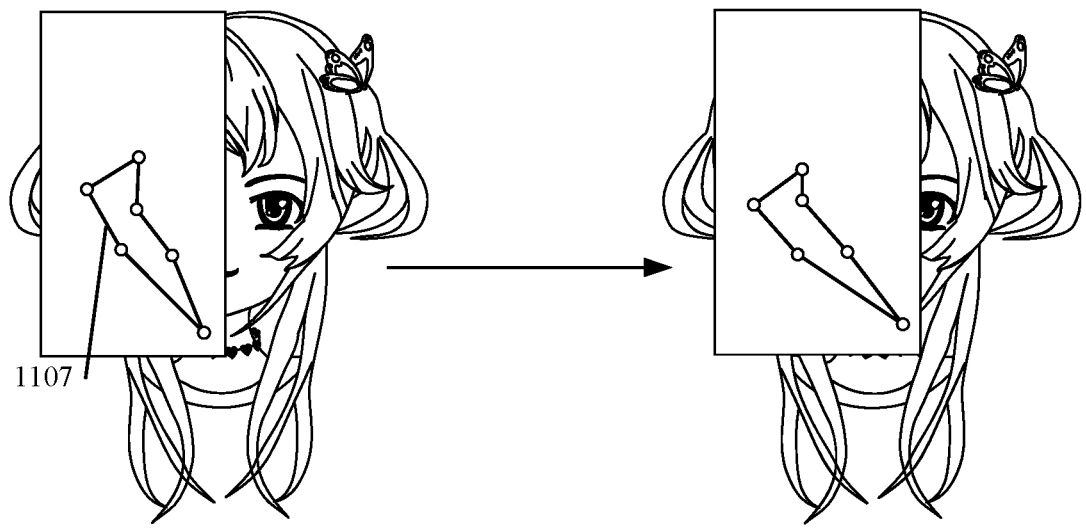
FIG. 11c shows a schematic diagram of changes in mesh data of a target mesh in a rendering process of a target virtual image according to some embodiments of this application.

The process of performing the mesh deformation on the mesh data of the mesh is described in conjunction with FIG. 11b. As shown in FIG. 11b, it is assumed that a target mesh includes five mesh vertices, including a mesh vertex A, a mesh vertex B, a mesh vertex C, a mesh vertex D and a mesh vertex E respectively. The five mesh vertices are adjacent to each other in sequence. Grid data of the target mesh after mesh deformation processing is obtained by means of controlling position information of all or part of the mesh vertices to change, and the target virtual image is rendered according to the mesh data of the target mesh after mesh deformation processing, thereby achieving an effect of controlling the target virtual image to perform an interaction action in the image display region. An exemplary schematic diagram of changes in mesh data of a target mesh in a rendering process of a target virtual image can be seen in FIG. 11c. As shown in FIG. 11c, after the mesh corresponding to a left hair element 1107 of the target virtual image moves to the right along the horizontal direction, the mesh deformation processing can be performed on the mesh corresponding to the left hair element 1107. Rendering can be performed according to the mesh data of the mesh after mesh deformation processing to obtain a target virtual image after the left hair element 1107 moves to the left.

Figure 11D:
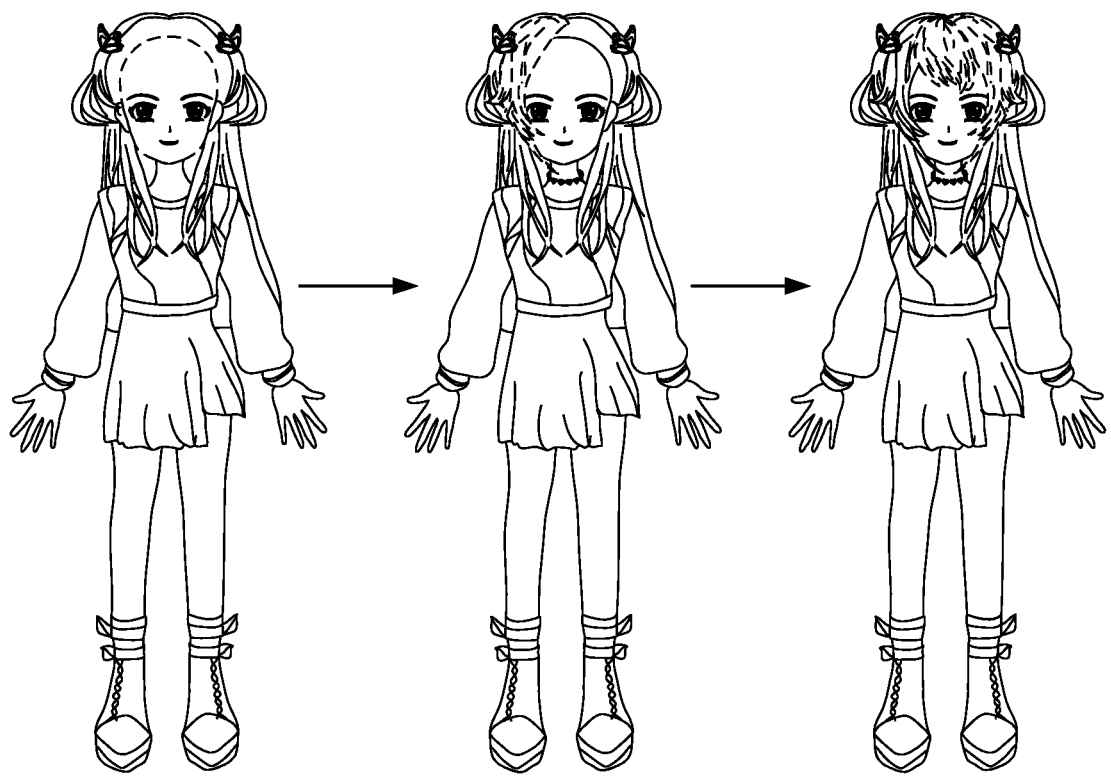
FIG. 11d shows a schematic diagram of hierarchical rendering of a target virtual image according to some embodiments of this application.

In the process of rendering the target virtual image on the basis of the mesh data, the target virtual image is rendered according to a hierarchical relationship of virtual images in sequence. As shown in FIG. 11d, an example in which the face and the hairs above the face of the target virtual image are rendered is used. A display hierarchy of the face element of the target virtual image is lower than that of the hair element of the target virtual image, and the hair element of the target virtual image includes a plurality of sub-elements, such as a left hair element and a middle hair element, and display hierarchies of these sub-elements are as follows: The display hierarchy of the left hair element is lower than that of the middle hair element. Based on this, when the target virtual image is rendered in an order according to the above display hierarchies from low to high, a rendering order of the various elements is: the face element→the left hair element→the middle hair element, thereby obtaining the target virtual image with a rendered face and rendered hairs above the face.

Based on the descriptions related to the grids added for the target virtual image and the mesh data, the following uses an example in which the movement information is the facial movement information and the limb information to describe a front-end interface and a background technology of step S203 in the embodiment shown in FIG. 2: Control, according to the movement information of the target session object, the target virtual image displayed in the image display region to perform a target interaction action.

Figure 12:
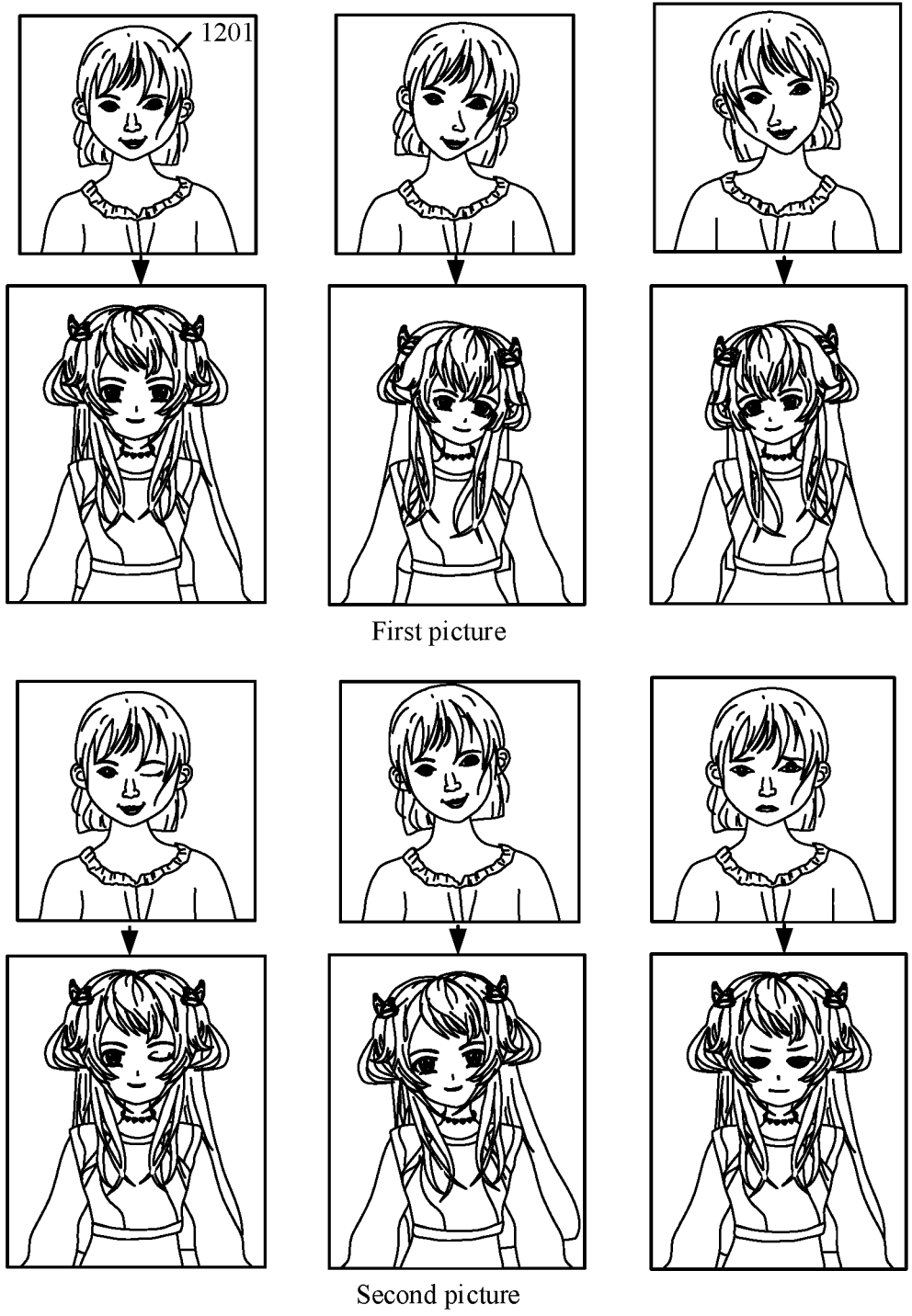
FIG. 12 shows a schematic diagram of controlling, on the basis of facial movement information of a target session object, a target virtual image to perform a target interaction action according to some embodiments of this application.

(1) The movement information of the target session object is facial movement information. Actions performed by the target session object and indicated by the facial movement information may include: an action of turning the head (such as turning the head towards a side, raising the head, lowering the head and tilting the head), an action of changing the five sense organs (for example, the corners of the mouth are upward, the corners of the mouth are downward, and the mouth is gathered to the middle according to opening and closing degrees), and the like. An exemplary schematic diagram of controlling, according to facial movement information of a target session object, a target virtual image to perform a target interaction action can be seen in FIG. 12. As shown in the first picture of FIG. 12, when the facial movement information about the target session object 1201 is keeping the head facing the camera, the head of the target virtual image can be controlled to be kept straight. If the facial movement information of the target session object is turning the head to the right, the head of the target virtual image can be controlled to perform a target interaction action of turning to the right. If the facial movement information of the target session object is turning the head to the left, the head of the target virtual image can be controlled to perform a target interaction action of turning to the left. As shown in the second picture of FIG. 12, different degrees of opening and closing of the eyes of the target session object represent that the target session object controls the eyes to perform different actions, such as winking, closing the eyes and glaring, and different shapes of the eyebrows of the target session object represent that the target session object controls the eyebrows to perform different actions, such as frowning and raising the eyebrows. In this implementation, when the facial movement information of the target session object is that the right eye winks, the right eye of the target virtual image can be controlled to perform an interaction action of winking. If the facial movement information of the target session object is glaring, the target virtual image can be controlled to perform an interaction operation of glaring. If the facial movement information of the target session object is frowning, the eyebrows of the target virtual image can be controlled to perform an interaction action of frowning.

Figure 13A:
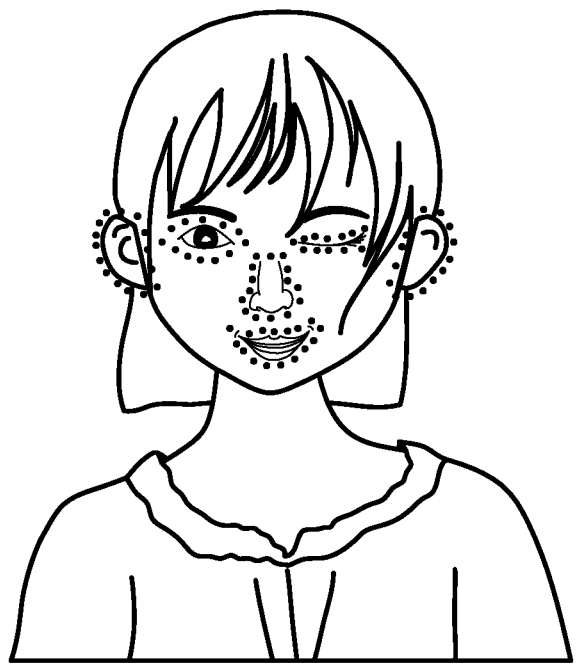
FIG. 13*a* shows a schematic diagram of a feature points that recognize the face of a target session object according to some embodiments of this application.
Figure 13B:
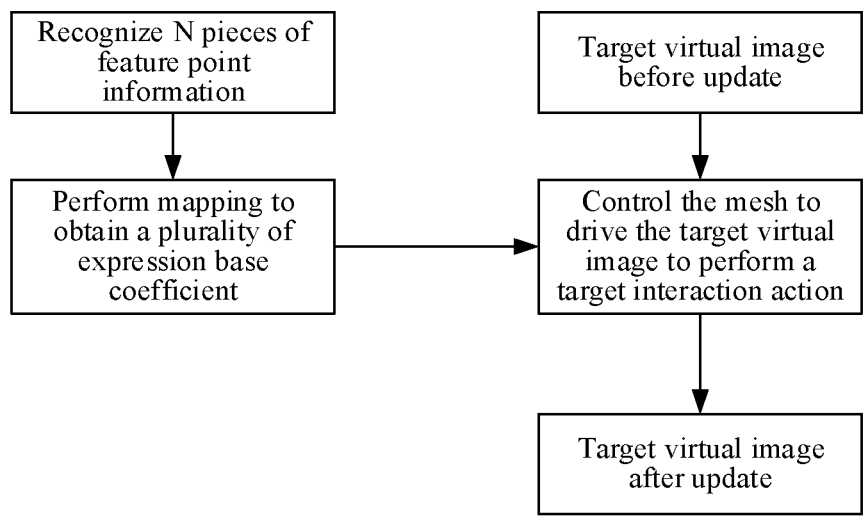
FIG. 13*b* shows a schematic diagram of controlling, on the basis of N pieces of feature point information, a target virtual image to perform a target interaction action according to some embodiments of this application.

In this embodiment of this application, the mesh deformation processing described above can be performed on a target mesh corresponding to an object element to control the target virtual image to perform the target interaction action. In a specific implementation, the facial movement information of the target session object may include N pieces of feature point information of the face of the target session object, N being an integer greater than 1. An exemplary schematic for recognizing feature points of the face of the target session object may be seen in FIG. 13a. The implementation of controlling, on the basis of N pieces of feature point information, a target virtual image to perform a target interaction action is described below with reference to FIG. 13b. First, an expression type after update (namely, a type of an expression after the target session object performs an action) of the target session object is determined on the basis of the N pieces of feature point information. Second, an expression base coefficient corresponding to the expression type after update is acquired. The mesh deformation processing is performed, according to the expression base coefficient corresponding to the expression type after update, on a mesh where an object element corresponding to the expression type after update is located. Actually, the mesh deformation processing is performed on mesh data of the grid. Finally, the target virtual image that performs the target interaction action is rendered and displayed on the basis of mesh data subjected to mesh deformation processing.

The expression type of the target session object may refer to a type of an expression of the face of the target session object. Performance states represented by the same object element on the face of the target session object are different under different expression types. For example, when the expression type is smile, the performance state of an object element, i.e., the mouth is: The corners of the mouth are upward. For another example, when the expression type is cry, the performance state of an object element, i.e., the mouth, is: The corners of the mouth are downward. An expression base coefficient of an expression type may be a coefficient used for representing a performance state of an object element. For example: A range of the expression base coefficient of the mouth can be defined to be [0,1]. It is assumed that when the expression base coefficient is 0, it indicates that the performance state of the mouth is closing the mouth; when the expression base coefficient is any value (for example, 0.5) within (0, 1), it indicates that the performance state of the mouth is opening the mouth; and when the expression base coefficient is 1, it indicates that the performance state of the mouth is maximally opening the mouth.

The above-mentioned implementation of acquiring an expression base coefficient corresponding to an expression type after update may include: An image containing the target session object may be captured by using a camera, and information extraction processing is performed on feature points of the face of the target session object in the image to obtain the N pieces of feature point information. The expression base coefficients of the various object elements of the face under the current expression type are fitted and generated according to the N pieces of feature point information. Generally, N may be 83, namely, there are 83 pieces of feature point information of the target session object. A quantity of the fitted and generated expression base coefficients of the object elements of the face is 52, namely, the plurality of object elements of the face of the target session object may have 52 performance states in total.

Figure 13C:
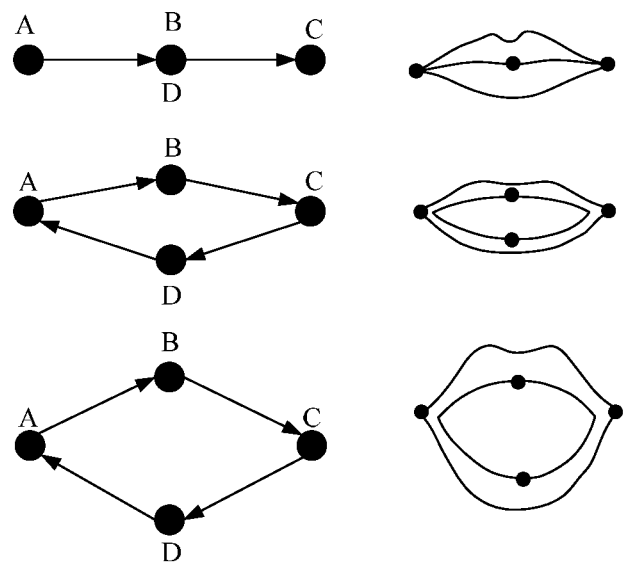
FIG. 13*c* shows a schematic diagram of dynamic changes of a mesh of the mouth according to some embodiments of this application.
Figure 13D:
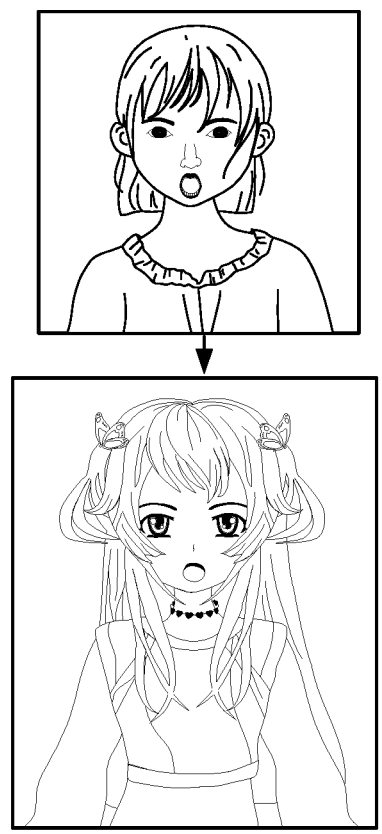
FIG. 13*d* shows a schematic diagram of a target session object and a target virtual image after performing an action of opening the mouth according to some embodiments of this application.

It is understood that in the process of rendering the target virtual image according to the expression base coefficient corresponding to the expression type after update, in terms of a visual effect, the object element of the target virtual image presents a dynamic change process. In other words, an expression base coefficient of an object element with an intermediate performance state also needs to be obtained according to the expression base coefficients of the expression types before (namely, before the target session object performs an action) and after update, so as to perform rendering according to the expression base coefficients before update, of the intermediate expression state and after update to obtain a dynamic change process in which the object element is relatively continuous. For example, in terms of a visual effect, when the action performed by the target session object is opening the mouth, the object element, i.e., the mouth, of the target virtual image has a dynamic change process from closing to opening, namely, gradually increasing a size of the mouth, is implemented through dynamically changing the mesh corresponding to the mouth. An exemplary schematic diagram of dynamic changes of a mesh of the mouth can be seen in FIG. 13c. In this implementation, a schematic diagram of the target session object and the target virtual image after performing the action of opening the month can be seen in FIG. 13d.

Figure 13E:
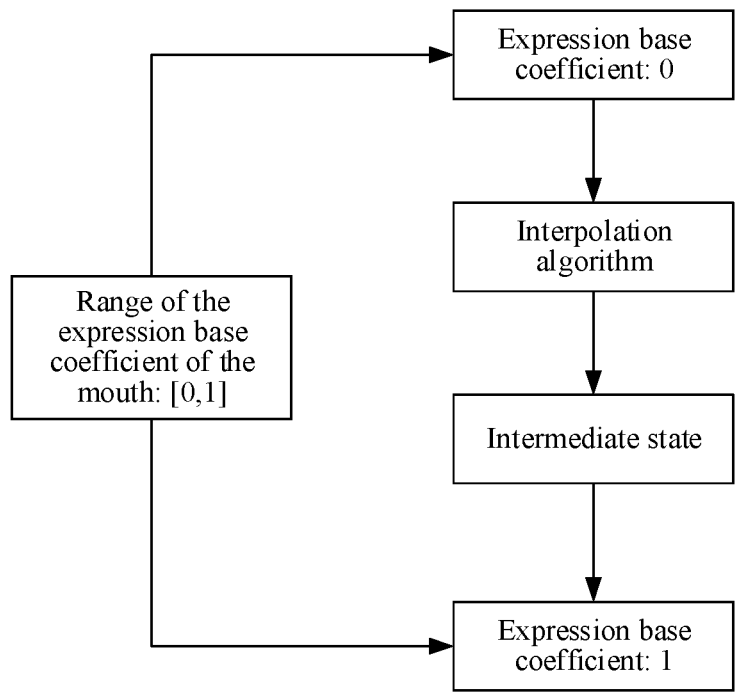
FIG. 13*e* shows a flow diagram of determining an intermediate state of the mouth by using an interpolation algorithm according to some embodiments of this application.

In a specific implementation, an expression base coefficient of an expression type before update may be acquired; a difference value between the expression base coefficient corresponding to the expression type after update and the expression base coefficient corresponding to the expression type before update is calculated to obtain a difference value result; and the mesh deformation processing is performed, according to the difference value result, the expression base coefficient of the expression state after update and the expression base coefficient of the expression state before update, on the mesh where the object element corresponding to the expression type after update is located, thus obtaining intermediate mesh data subjected to mesh deformation processing, so that rendering is performed on the basis of the intermediate mesh data to obtain a dynamic change process in which the object element is relatively continuous. The above-mentioned process can be simply considered as an interpolation process. For example, in the process of increasing the size of the mouth, the interpolation algorithm may be used to insert some pixel points in an added region, so that various feature points on the mouth can be also clearly presented in the process of increasing the size of the mouth, so that the whole dynamic process looks fluent and clear. The interpolation algorithm may include, but is not limited to: a linear interpolation algorithm, a Bezier curve difference algorithm, and the like. An example in which the dynamic change of the mouth described in the above example is used. A flow diagram of determining an intermediate state of the mouth by using an interpolation algorithm can be seen in FIG. 13e.

Figure 14A:
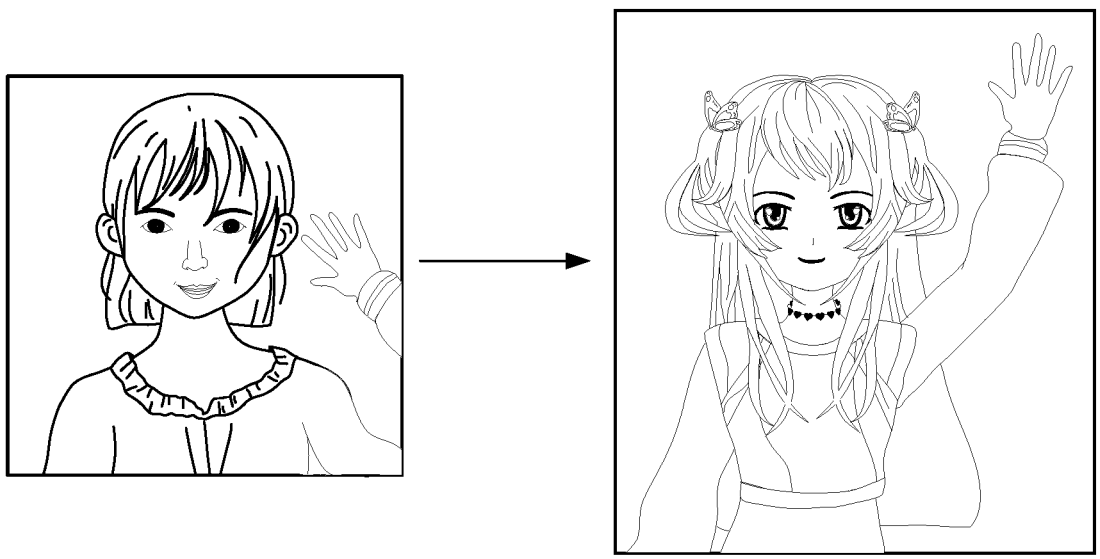
FIG. 14*a* shows a schematic diagram of controlling a target virtual image to perform an action of waving the hand according to some embodiments of this application.

(2) The movement information of the target session object is limb information. The limb information may be used for reflecting states of the body of the target session object. The body (or limbs) may include but is not limited to arms (such as large arms, small arms, and palms), thighs, shanks, feet, and the like. For convenience of explanation, the following will use an example, in which the limb is an arm, for description. This is stated here. For example, when the limb information of the target session object indicates that the right hand of the target session object waves, the right hand of the target virtual image may be controlled to also perform an interaction action of waving the hand. An exemplary schematic diagram of this implementation can be seen in FIG. 14a. As shown in FIG. 14a, when the target session object performs an action of waving a hand, the target virtual image can be controlled to also perform an interaction action of waving a hand according to the limb information of the target session object. In a specific implementation, position information of S limb points of the target session object can be determined according to the limb information of the target session object, S being an integer greater than zero. An angle value of a corresponding body element is calculated on the basis of the position information of the S limb points. The mesh deformation processing is performed, according to the angle value, on the mesh corresponding to the body element in the target virtual image, and then rendering is performed on the basis of mesh data subjected to mesh deformation processing same, so as to obtain a target virtual image after a limb performs the target interaction action. In other words, the various limb points of the body and the position information of the various limb points can be obtained by analyzing the collected limb information of the target session object. The angle values (or referred to as a body angle) between the various limb points are calculated according to the position information of the various limb points. For example, an angle value between an elbow and a shoulder is 60 degrees. The mesh deformation processing is performed on the mesh corresponding to the body element according to the angle value, thereby controlling the limb corresponding to the body element in the target virtual image to perform the target interaction action.

Figure 14B:
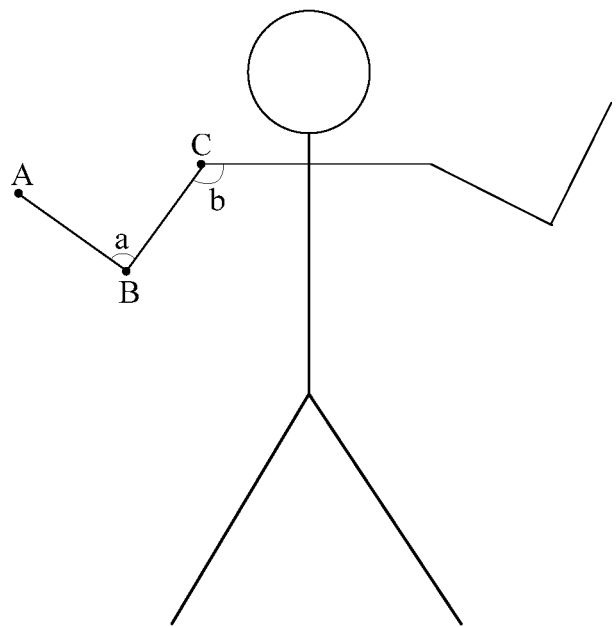
FIG. 14*b* shows a schematic diagram of controlling a target virtual image to perform a target interaction action by means of limb points according to some embodiments of this application.

For example, FIG. 14b shows a schematic diagram of controlling a target virtual image to perform a target interaction action by means of limb points according to some embodiments of this application. As shown in FIG. 14b, the left arm and the right arm of the target session object each include three limb points. The left arm is taken as an example, including a limb point A, a limb point B and a limb point C. According to the position information of the limb point A, the position information of the limb point B and the position information of the limb point C, angle values of body elements can be obtained. For example, an angle value between the small arm (namely, the body element) and the large arm is a, and an angle value between the large arm and the shoulder is b. The mesh deformation processing can be performed on the meshes of the object elements corresponding to the target virtual image according to the angle values, thereby controlling the left arm of the target virtual image to perform the same action as the left arm of the target session object. This manner of driving the body to perform actions according to the limb points makes the target virtual image more vivid and natural.

Of course, in addition to the performing the mesh deformation on the meshes corresponding to the body elements in the target virtual image according to the angle values, so as to make the body elements of the target virtual image perform an action with the same angle values as that of the action performed by the body elements of the target session object. This embodiment of this application also supports triggering to play a body animation configured for the target virtual image after an action type of the limb action of the target session object is detected, so as to control the target virtual image to perform a body action similar to the action of the target session object. For example, after it is detected that the target session object performs an action of waving a hand, an action of waving a hand configured for the target virtual image may be triggered to be played. At this time, the angle value between the large arm and the small arm (or the large arm and the shoulder) when the target virtual image performs the action of waving a hand does not necessarily match the angle value of the target session object. For another example, when it is detected that the target session object performs an action of making a heart shape with a single hand, a gesture of making a heart shape with two hands configured for the target virtual image can be triggered. For another example, when it is detected that the target session object performs an "OK" gesture, an "OK" gesture configured for the target virtual image can be triggered. Or the like. By this manner of directly triggering the target virtual image to perform a matching body animation after the action type of the target session object is detected, the fluency and fastness of the interaction action performed by the target virtual image can be improved to a certain extent.

In conclusion, steps S1003-S1005 show an implementation provided by this embodiment of this application for controlling, according to the movement information of the target session object, the target virtual image to perform the target interaction action, which is specifically implemented by taking the movement information respectively being the facial movement information and the limb information as an example, and performing the mesh deformation on the mesh according to the movement information. However, it is understood that the implementation of controlling, according to the movement information of the target session object, the target virtual image to perform the target interaction action is not necessarily obtained by performing the mesh deformation on the mesh. The following uses an example in which the movement information is respectively emotional information and position change information, to provide another implementation of a front-end interface and a background technology for controlling a target virtual image to perform a target interaction action.

Figure 15A:
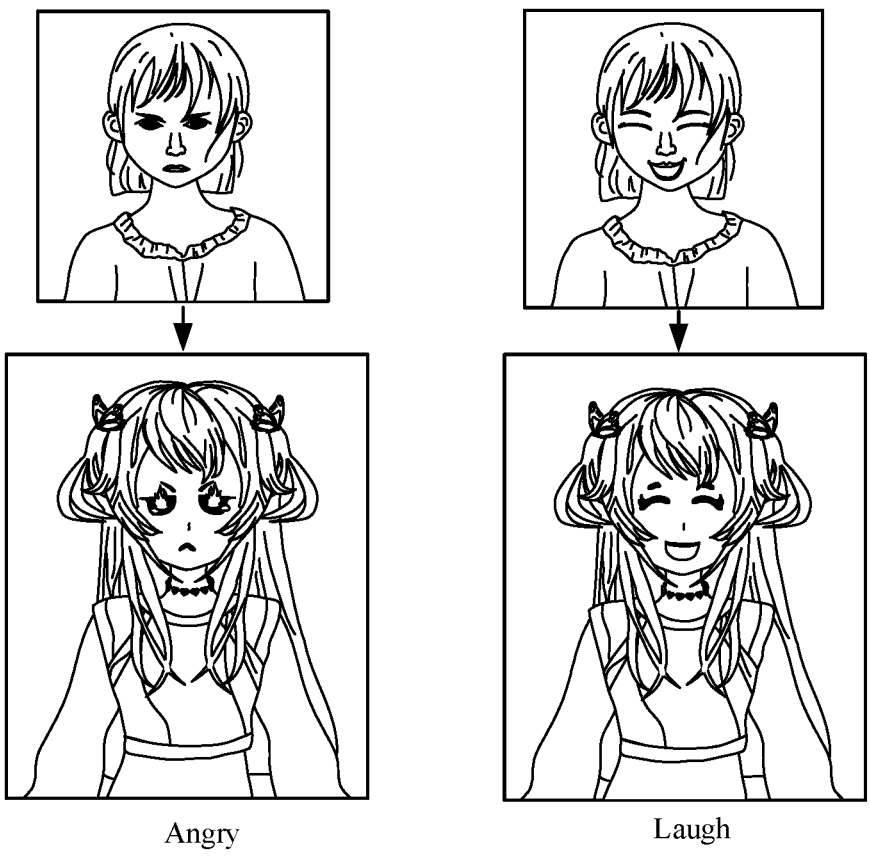
FIG. 15*a* shows a schematic diagram of replacing the face of a target virtual image with a target facial resource according to some embodiments of this application.
Figure 15B:
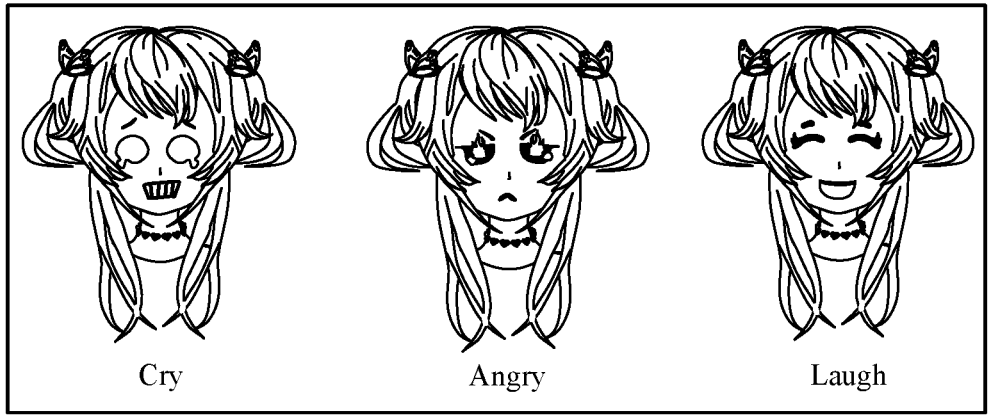
FIG. 15*b* shows a schematic diagram of a preset exaggerated expression according to some embodiments of this application.

(1) The movement information of the target session object is emotional information. The emotional information may be used for indicating a type of an emotion of the target session object. For example, types of emotions of the target session object include: laugh, anger, surprise, cry, and the like. It is understood that the above-mentioned driving, according to the type of the emotion of the target session object, the object element of the face of the target virtual image to perform some actions can convey the emotion of the target session object to a certain extent. However, a target virtual image of the comic world often uses more exaggerated expressions to express emotions. In order to ensure that the target virtual image presents a more exaggerated expression, this embodiment of this application sets a mapping relationship of exaggerated expressions between the target session object and the target virtual image. When it is detected that a preset exaggerated expression appears on the target session object, the preset exaggerated expression can be used to perform resource (or material) replacement on an original face material of the target virtual image, so as to change the original face material of the target virtual image with an exaggerated face material, so as to achieve rapid face change and improve control efficiency. With reference to FIG. 15a, when an emotion expressed by the target session object is anger, a preset facial resource of anger can be used to replace an original facial resource of the target virtual image, so as to obtain a target virtual image conveying the emotion of anger. If an emotion expressed by the target session object is laugh, a preset facial resource of laugh can be used to replace an original facial resource of the target virtual image, so as to obtain a target virtual image conveying the emotion of laugh. Several exemplary exaggerated expressions provided by this embodiment of this application can be seen in FIG. 15b.

Figure 15C:
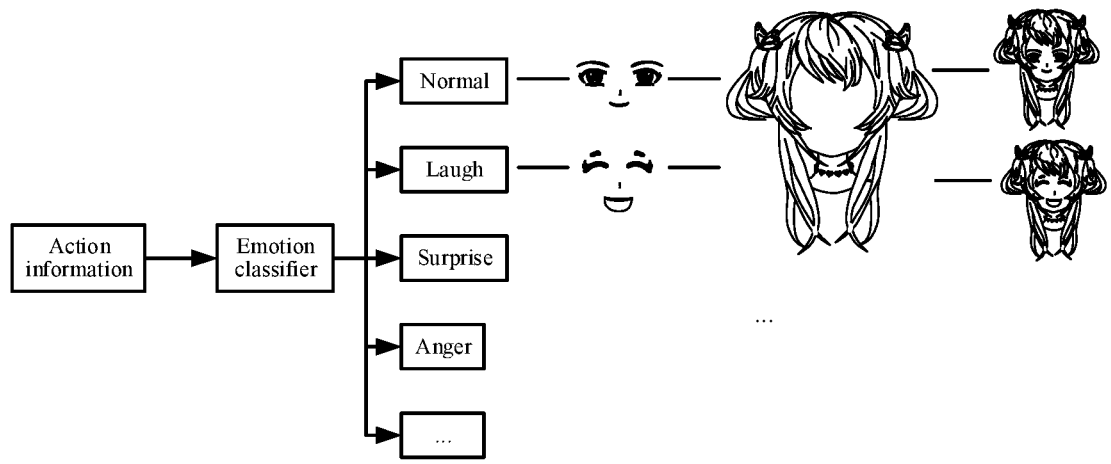
FIG. 15*c* shows a flow diagram of replacing a facial resource according to some embodiments of this application.

In a specific implementation, an emotional state of the target session object may be recognized according to the emotional information to obtain a current emotional state of the target session object. A target facial resource matching the current emotional state is determined on the basis of the current emotional state. The face of the target virtual image is updated in the image display region using the target facial resource to obtain a target virtual image after update. In some embodiments, an emotion recognition model can be used to recognize the emotional state of the target session object. In more detail, a deep learning method is used to perform emotion recognition and emotion classification on a real-time collected image containing the target session object, including but not limited to: surprise, laugh, anger, smile and other emotion classes with specific semantics. After an emotion recognition class corresponding to the target session object is recognized, the target virtual image can be triggered to perform an expression effect of a corresponding exaggerated expression. The expression effect of the exaggerated expression performed by the target virtual image is achieved in the following manner: After an emotion classification result of the target session object is recognized, the original facial resource of the target virtual image can be hidden, and the preset target facial resource can be displayed on the face to display the expression effect of the exaggerated expression. A flow diagram of the above-mentioned replacement of the facial resource can be seen in FIG. 15c and will not be described in detail here.

(2) The movement information of the target session object is position change information. The position change information can be used for indicating movement information of the target session object in an environment. Specifically, position change information of a certain object element contained in the target session object can be used to represent the position change information of the target session object. For example: The face element of the target session object moves to the left in a horizontal direction; the face element of the target session object moves up in a vertical direction; a display area of the face element of the target session object is reduced (indicating that a distance from the target session object to the terminal screen varies); and the like. Driving, on the basis of the position change information of the target session object, the target virtual image to perform a corresponding position change action in the image display region enables the target session object and the target virtual image have a better sense of mapping.

In a specific implementation, after the position change information of the target session object is acquired, when it is detected that the position change information is movement information of a target image point, the target virtual image is controlled, according to the movement information of the target image point, to perform movement display in the image display region. If the position change information is movement information of a target image region, a display area of the target virtual image in the image display region may be adjusted according to the movement information of the target image region. The target image point may refer to a point of a display region where the target virtual image is located. For example, the target image point is a central point of the face of the target virtual image. The target image region may refer to an image region of the display region where the target virtual image is located. For example, the target image region is a face region of the target virtual image. In detail, in order to enable the target virtual image to have a three-dimensional perspective effect, this embodiment of this application supports driving, according to the position change information of the target session object, the target virtual image to move and rotate along three axes x, y and z, so as to control the target virtual image to move and rotate in the image display region.

An implementation logic of driving the target virtual image to move along the three axes x, y and z may include: (1) Acquire multiple continuous frames of environment images, recognize the position change information of the target image point (such as the central point of the face) of the target virtual image in the multiple frames of environment images, and drive, according to the position change information, the target virtual image to perform a matching movement in the image display region. The position movement information at this time may include: Any one of horizontal position change information along the x-axis, longitudinal position change position along the y-axis, and both horizontal position change information along the x-axis and longitudinal position change position along the y-axis. (2) Acquire multiple continuous frames of environment images, recognize change information of the display area occupied, in the environment images, by a target image region (such as a face region) in the target virtual image, and zoom in or out the target virtual image in the image display region according to the change information of the display area, so as to achieve a dynamic effect of controlling the target virtual image to change in a z-axis direction.

An implementation logic of driving the target virtual image to perform a rotation operation may include: During collection of the environment images, recognize the face of the target session object in the environment images, acquire an Euler angle to which the current face faces, and then perform, according to the Euler angle to which the current face faces, mesh deformation on the mesh corresponding to the face element of the target virtual image, so as to achieve a rotation effect that controls the face of the target virtual image. Of course, when other body parts (such as the shoulders) of the target session object rotate, the mesh deformation processing can be controlled to be performed on the mesh corresponding to the shoulder element of the target virtual image by using the above-mentioned implementation, so as to achieve a rotation effect that controls the shoulders of the target virtual image. This embodiment of this application does not limit an object element of the target virtual image controlled to rotate.

In this embodiment of this application, the target virtual image can be displayed in the video session interface of the video session, and the target virtual image is driven, according to movement information of the target session object, to perform the target interaction action, so that the target session object can participate in the video session by using the target virtual image. This manner of outputting the target virtual image in the video session interface can quickly display the target virtual image. In addition, the target virtual image can be used for representing the target session object to participate in the video session. Using a virtual image to simulate real-person interactions can avoid displaying a real image of the target session object in the video session, to protect an image privacy of the target session object. In addition, the target virtual image is a 2D virtual image, and a mesh corresponding to the 2D virtual image is driven to flexibly follow an action of the target session object to perform a target interaction action. Due to an innovation made to the 2D virtual image, the 2D virtual image with low production cost can achieve a realistic effect similar to that of a 3D virtual image, thereby reducing a communication running cost of a virtual image.

Figure 16:
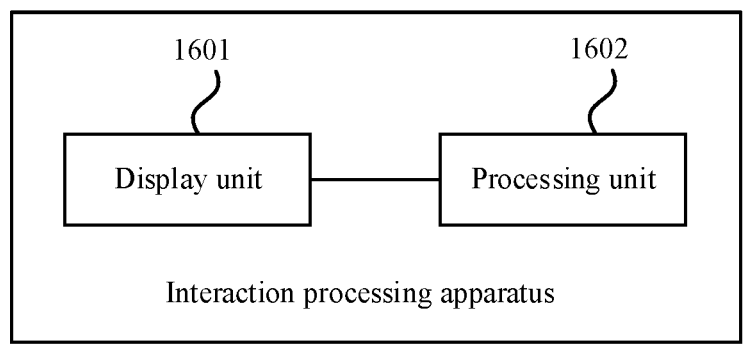
FIG. 16 shows a schematic structural diagram of an interaction processing apparatus according to some embodiments of this application.

FIG. 16 shows a schematic structural diagram of an interaction processing apparatus according to an embodiment of this application. The interaction processing apparatus is installed in a target terminal. In some embodiments, the interaction processing apparatus may be a client (such as an application program with a video session function) running in the target terminal. Specific implementations of units included in the interaction processing apparatus are described with reference to related contents in the foregoing embodiments. Referring to FIG. 16, the interaction processing apparatus of this embodiment of this application includes the following units:

a display unit 1601, configured to display, in a video session, a video session interface, the video session interface including an image display region configured to display a video session object; the video session object including a target session object corresponding to the target terminal and other session objects participating in a video session; and a processing unit 1602, configured to display a target virtual image of the target session object in the image display region;

the processing unit 1602 being further configured to acquire movement information of the target session object, and control, according to the movement information of the target session object, the target virtual image displayed in the image display region to execute a target interaction action.

In one embodiment, the processing unit 1602 is also configured to: transmit, to terminals of the other session objects, relevant data of the controlling, according to the movement information, the target virtual image to perform a target interaction action, the terminals of the other session objects performing, according to the relevant data, rendering to obtain the target virtual image that performs the target interaction action.

In some embodiments, the processing unit 1602 is further configured to:
- display an image selection window, the image selection window including an image selection element;
- display, in response to a trigger operation performed on the image selection element, a reference virtual image in a reference display region, and display candidate virtual images in the image selection window;
- update, in response to an image selection operation performed on the candidate virtual images, the reference virtual image to be displayed as a target candidate virtual image selected by the image selection operation; and
- determine, in response to a virtual image confirm operation, that the target candidate virtual image is the target virtual image.

In some embodiments, the processing unit 1602 is further configured to:
- display a background selection element in the image selection window;
- display candidate background images in the image selection window in response to a user operation performed on the background selection element;
- display, in the reference display region in response to a background selection operation performed on the candidate background images, a target candidate background image selected by the background selection operation; and
- set the target candidate background image as a background image of the image display region in response to a background image confirm operation.

In some embodiments, the processing unit 1602 is further configured to:
- display a voice selection element in the image selection window;
- display a candidate voice audio processing rule in the image selection window in response to a selection operation performed on the voice selection element; and
- determine, in response to a confirm operation performed on the candidate voice audio processing rule, that the candidate voice audio processing rule is a target voice audio processing rule, the target voice audio processing rule being used for performing simulation processing on a sound signal of the target session object received in the video session, so as to obtain a sound effect matching the target virtual image.

In some embodiments, the image selection window includes a quit option, and the processing unit 1602 is further configured to:
- display the video session interface in response to a click operation performed on the quit option;
- display an environment image in the image display region contained in the video session interface, the environment image being obtained by capturing an environment; and
- send the environment image to peer devices so that the peer devices display the environment image, the peer device referring to a device used by other users participating in a video session.

In some embodiments, when the processing unit 1602 is configured to the control, according to the movement information of the target session object, the target virtual image displayed in the image display region to perform a target interaction action, the processing unit is specifically configured to perform any one or more of the following steps:
- controlling, when the movement information of the target session object is facial movement information, the target virtual image to perform a facial interaction action;
- replacing, when the movement information of the target session object is emotional information, the face of the target virtual image with a target facial resource associated with the emotional information, and displaying the target facial resource;
- controlling, when the movement information of the target session object is limb information, a target limb of the target virtual image to perform a limb action; and
- controlling, in the image display region when the movement information of the target session object is position change information, the target virtual image to perform a position change action.

In some embodiments, when the processing unit 1602 is configured to the control, according to the movement information of the target session object, the target virtual image displayed in the image display region to perform a target interaction action, the processing unit is specifically configured to:
- acquire a mesh set added for the target virtual image, the mesh set including a plurality of grids and mesh data of the various grids, and one mesh corresponding to one object element; any mesh being composed of at least three mesh vertices, and the mesh data of any mesh referring to state values of the various mesh vertices contained in the any grid; the object elements being single elements constituting the target virtual image;
- perform mesh deformation on the mesh data of a target mesh in the mesh set according to the movement information of the target session object; and
- render and display, on the basis of mesh data subjected to the mesh deformation processing, the target virtual image that performs the target interaction action, wherein during the rendering and displaying the target virtual image that performs the target interaction action, a position and/or shape of the object element corresponding to the target mesh change(s).

In some embodiments, the movement information includes facial movement information; the facial movement information includes N pieces of feature point information of the face of the target session object, and N is an integer greater than 1. When the processing unit 1602 is configured to perform mesh deformation on the mesh data of a target mesh in the mesh set according to the movement information of the target session object, the processing unit is specifically configured to:
- determine an expression type after update of the target session object on the basis of the N pieces of feature point information;
- acquire an expression base coefficient corresponding to the expression type after update; and
- perform, according to the expression base coefficient corresponding to the expression type after update, the mesh deformation on a mesh where an object element corresponding to the expression type after update is located.

In some embodiments, when the processing unit 1602 is configured to perform, according to the expression base coefficient corresponding to the expression type after update, the mesh deformation on a mesh where an object element corresponding to the expression type after update is located, the processing unit is specifically configured to:

acquire an expression base coefficient of an expression type before update;

calculate a difference value between the expression base coefficient corresponding to the expression type after update and the expression base coefficient corresponding to the expression type before update to obtain a difference value result; and perform, according to the difference value result, the expression base coefficient of the expression state after update and the expression base coefficient of the expression state before update, the mesh deformation on the mesh where the object element corresponding to the expression type after update is located.

In some embodiments, the movement information includes limb information, and when the processing unit 1602 is configured to perform mesh deformation on the mesh data of a target mesh in the mesh set according to the movement information of the target session object, the processing unit is specifically configured to:

determine position information of S limb position points of the target session object according to the limb information of the target session object, S being an integer greater than zero;

calculate an angle value of a corresponding body element on the basis of the position information of the S limb position points; and perform the mesh deformation on a mesh corresponding to the body element in the target virtual image according to the angle value.

In some embodiments, the movement information includes emotional information, and when the processing unit 1602 is configured to control, according to the movement information of the target session object, the target virtual image displayed in the image display region to perform a target interaction action, the processing unit is specifically configured to:

recognize an emotional state of the target session object according to the emotional information to obtain a current emotional state of the target session object;

determine, on the basis of the current emotional state, a target facial resource matching the current emotional state; and update, in the image display region, the face of the target virtual image using the target facial resource to obtain a target virtual image after update.

In some embodiments, the movement information includes position change information, and when the processing unit 1602 is configured to control, according to the movement information of the target session object, the target virtual image displayed in the image display region to perform a target interaction action, the processing unit is specifically configured to:

control, according to the movement information of the target image point when the position change information is movement information of a target image point, the target virtual image to perform movement display in the image display region; and adjust, when the position change information is movement information of a target image region, a display area of the target virtual image in the image display region according to the movement information of the target image region.

In some embodiments, the processing unit 1602 is further configured to:

acquire, when the target terminal initiates a video session, a target image acquired by collecting an environment;

perform feature recognition on the target session object in the target image to obtain a recognition result; and allocate a virtual image matching the recognition result to the target session object, and determine the virtual image matching the recognition result as the target virtual image.

According to one embodiment of this application, various units in the interaction processing method shown in FIG. 16 can be respectively or all combined into one or several other units, or a certain unit (some units) thereof can also be divided into a plurality of functionally smaller units. This can achieve the same operation without affecting implementations of technical effects of the embodiments of this application. The above-mentioned units are divided on the basis of logical functions. In practical applications, the function of one unit may also be implemented by a plurality of units, or the functions of a plurality of units may be implemented by one unit. In other embodiments of this application, the interaction processing apparatus may also include other units. In practical applications, these functions may also be implemented under the help of other units, and may be cooperatively implemented by a plurality of units. According to another embodiment of this application, computer programs (including program codes) capable of performing all the steps involved in the corresponding methods as shown in FIG. 2 to FIG. 10 can be run in a general computing device, such as a computer, including a central processing unit (CPU), a random-access memory (RAM), a read-only memory (ROM) and other processing elements and memory elements, so as to construct the interaction processing apparatus as shown in FIG. 16, and to implement the interaction processing method of the embodiments of this application. The computer programs may be recorded, for example, on a computer-readable memory, loaded to the above-described computing device through the computer-readable memory, and run in the computing device.

In this embodiment of this application, the display unit 1601 can display the target virtual image in the video session interface of the video session, and the processing unit 1602 can drive, according to movement information of the target session object, the target virtual image is driven to perform the target interaction action, so that the target session object can participate in the video session by using the target virtual image. This manner of outputting the target virtual image in the video session interface can quickly display the target virtual image. In addition, the target virtual image can be used for representing the target session object to participate in the video session. Using the virtual image to simulate real-person interactions can avoid displaying a real image of the target session object in the video session, to protect an image privacy of the target session object. Furthermore, this embodiment of this application does not need to transmit videos collected by the camera and related to the video session objects, but transmits only the relevant data of the video session objects. Compared with transmission of videos, the transmission of only the relevant data reduces a data transmission amount and improves data transmission efficiency.

Figure 17:
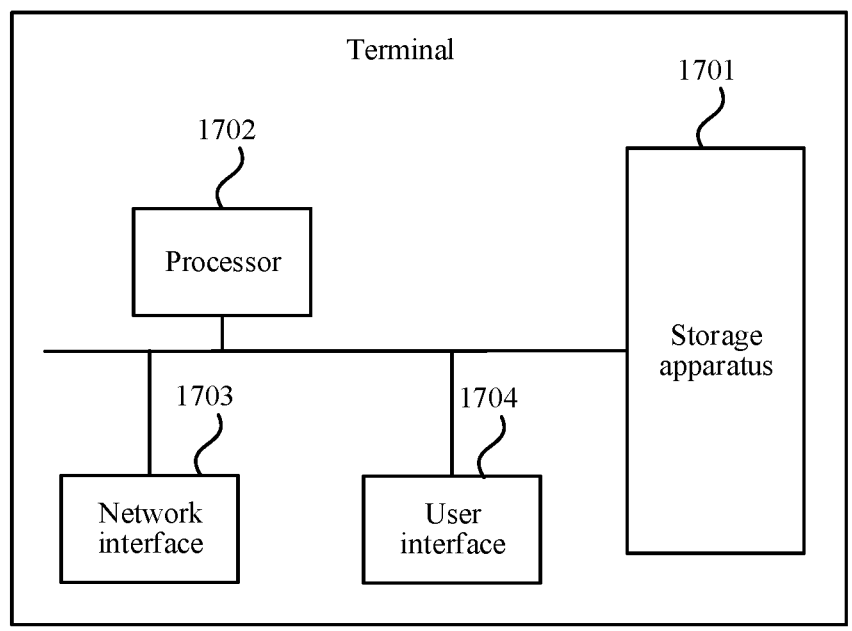
FIG. 17 is a schematic structural diagram of a terminal device according to some embodiments of this application.

FIG. 17 is a schematic structural diagram of a terminal according to some embodiments of this application. Referring to FIG. 17, the terminal includes a storage apparatus 1701 and a processor 1702. In this embodiment of this application, the terminal further includes a network interface 1703 and a user interface 1704. The terminal may be a smart phone, a tablet, a smart wearable device, and the like, and is capable of accessing an Internet via the network interface 1703, communicating with a server and other electronic devices for data interaction. The user interface 1704 may include a touch display screen and the like, is capable of receiving user operations, and may also display various interfaces to a user to facilitate receiving the user operations.

The storage apparatus 1701 may include a volatile memory such as an RAM. The storage apparatus 1701 may also include a non-volatile memory, such as a flash memory, a solid-state drive (SSD), and the like. The storage apparatus 1701 may also include a combination of the above kinds of memories.

The processor 1702 may be a central processing unit (CPU). The processor 1702 may further include a hardware chip. The hardware chip may be an application-specific integrated circuit (ASIC), a programmable logic device (programmable logic device, PLD), and the like. The PLD may be a field-programmable gate array (FPGA), a generic array logic (generic array logic, GAL), and the like.

A computer program is stored in the storage apparatus 1701 of this embodiment of this application. The processor 1702 invokes the computer program in the storage apparatus. When the computer program is executed, the processor 1702 can be configured to implement the method described above, such as the embodiments corresponding to FIG. 2 and FIG. 10.

In one embodiment, the terminal may correspond to the target terminal described above. The storage apparatus 1701 stores the computer program. The computer program is loaded and executed by the processor 1702 to implement the corresponding steps in the interaction processing method embodiment described above.

An embodiment of this application also provides a computer-readable memory that is a memory device in an electronic device to store programs and data. It is understood that the computer-readable memory here can include both a built-in memory in the electronic device and an extended memory supported by the electronic device. The computer-readable memory provides a storage space that stores a processing system of the electronic device. Furthermore, a computer program (including program codes) adapted to be loaded and executed by the processor 1702 is also stored in the storage space. The computer-readable memory herein may be either a high-speed RAM or a non-volatile memory, such as at least one disk memory. In some embodiments, there may be at least one computer-readable memory located away from the aforementioned processor.

According to one aspect of this application, a computer program product or a computer program is provided. The computer program product or the computer program includes computer instructions stored in a computer-readable memory. The processor of the terminal reads the computer instructions from the computer-readable storage medium, and executes the computer instructions, so that the terminal implements the interaction processing method provided in the various optional manners.

Those of skill in the art would recognize that the various illustrative units and algorithm steps described in connection with the embodiments disclosed in this application may be implemented as electronic hardware, or combinations of computer software and electronic hardware. Whether these functions are implemented as hardware or software depends on particular application and design constraint conditions of the technical solutions. Professionals may implement the described functions in varying ways for each particular application, but such implementation should not be interpreted as departing from the scope of this application.

It is understood by those of ordinary skill in the art that all or part of the processes of the methods of the embodiments described above may be implemented by instructing relevant hardware by a computer program. The program may be stored in a computer-readable memory; and the program, when executed, may include the processes of the embodiments of the methods described above. The memory may be a magnetic disk, an optical disk, a ROM, an RAM, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The above is only embodiments of this application and are not, of course, intended to limit the scope of this application, so that equivalent changes made according to the claims of this application still fall within the scope of this application.

What is claimed is:

1. A method performed by a computing device acting as a target terminal in a video session, the method comprising:
displaying, by the target terminal, a video session interface, the video session interface including an image display region for displaying images associated with one or more users participating in the video session;
displaying, by the target terminal, a target virtual image of a target virtual object corresponding to a user of the target terminal in the image display region;
controlling, according to movement information of the user captured by the target terminal, the target virtual image displayed in the image display region to perform a target interaction action corresponding to the movement information of the user, further including:
determining a type of the movement information of the user based on differences of two images of the user captured by the target terminal at two different points in time;
identifying an object element of the target virtual object according to the determined type of the movement information of the user;
acquiring a set of meshes associated with the identified object element of the target virtual object, each mesh having a plurality of vertices and each vertex in the mesh having a corresponding position value and a position relationship value of the vertex relative to other vertices of the same mesh;
performing mesh deformation on the position values and the position relationship values of respective vertices in the set of meshes according to the determined type of the movement information of the user; and
determining movement data of the target virtual image that has the identified object element performing the target interaction action according to the mesh deformation of the set of meshes of the identified object element of the target virtual object; and
transmitting, by the target terminal, the movement data of the target virtual image performing the target interaction action, to terminals of the other users of the video session, wherein the movement data renders the target virtual image to perform the target interaction action on the corresponding terminals.

2. The method according to claim 1, wherein the controlling, according to movement information of the user captured by the target terminal, the target virtual image displayed in the image display region to perform a target interaction action corresponding to the movement information of the user comprises any one or more of following operations:
controlling, when the movement information of the user is facial movement information, the target virtual image to perform a corresponding facial interaction action;
replacing, when the movement information of the user is emotional information, the target virtual image with a target facial image associated with the emotional information, and displaying the target facial image;
controlling, when the movement information of the user is limb information, a target limb of the target virtual image to perform a limb action; and
controlling, when the movement information of the user is position change information, the target virtual image to perform a corresponding position change action in the image display region.

3. The method according to claim 1, wherein the movement information comprises emotional information, and the controlling, according to movement information of the user captured by the target terminal, the target virtual image displayed in the image display region to perform a target interaction action corresponding to the movement information of the user comprises:
recognizing an emotional state of the user according to the emotional information to obtain a current emotional state of the user;
determining, on the basis of the current emotional state, a target facial resource matching the current emotional state; and
updating the target virtual image using the target facial resource to obtain an updated target virtual image in the image display region.

4. The method according to claim 1, wherein the movement information comprises position change information, and the controlling, according to movement information of the user captured by the target terminal, the target virtual image displayed in the image display region to perform a target interaction action corresponding to the movement information of the user comprises:
when the position change information is movement information of a target image point, controlling the target virtual image to perform movement display in the image display region according to the movement information of the target image point; and
when the position change information is movement information of a target image region, adjusting a display area of the target virtual image in the image display region according to the movement information of the target image region.

5. The method according to claim 1, the method further comprising:
displaying an image selection window, the image selection window comprising an image selection element;
displaying, in response to a trigger operation performed on the image selection element, a reference virtual image in a reference display region, and displaying candidate virtual images in the image selection window;
updating, in response to an image selection operation performed on the candidate virtual images, the reference virtual image to be displayed as a target candidate virtual image selected by the image selection operation; and
determining, in response to a virtual image confirm operation, that the target candidate virtual image is the target virtual image.

6. The method according to claim 1, the method further comprising:
when the target terminal initiates the video session, acquiring a target image of the user;
performing feature recognition on the user in the target image to obtain a recognition result of the user; and
assigning a virtual image matching the recognition result of the user as the target virtual image.

7. A computing device acting as a target terminal in a video session, the computing device comprising: a storage apparatus and a processor;
the storage apparatus being configured to store a computer program; and
the processor being configured to run the computer program stored in the storage apparatus to implement a method including:
displaying, by the target terminal, a video session interface, the video session interface including an image display region for displaying images associated with one or more users participating in the video session;
displaying, by the target terminal, a target virtual image of a target virtual object corresponding to a user of the target terminal in the image display region;
controlling, according to movement information of the user captured by the target terminal, the target virtual image displayed in the image display region to perform a target interaction action corresponding to the movement information of the user, further including:
determining a type of the movement information of the user based on differences of two images of the user captured by the target terminal at two different points in time;
identifying an object element of the target virtual object according to the determined type of the movement information of the user;
acquiring a set of meshes associated with the identified object element of the target virtual object, each mesh having a plurality of vertices and each vertex in the mesh having a corresponding position value and a position relationship value of the vertex relative to other vertices of the same mesh;
performing mesh deformation on the position values and the position relationship values of respective vertices in the set of meshes according to the determined type of the movement information of the user; and
determining movement data of the target virtual image that has the identified object element performing the target interaction action according to the mesh deformation of the set of meshes of the identified object element of the target virtual object; and
transmitting, by the target terminal, the movement data of the target virtual image performing the target interaction action, to terminals of the other users of the video session, wherein the movement data renders the target virtual image to perform the target interaction action on the corresponding terminals.

8. The computing device according to claim 7, wherein the controlling, according to movement information of the user captured by the target terminal, the target virtual image displayed in the image display region to perform a target interaction action corresponding to the movement information of the user comprises any one or more of following operations:

controlling, when the movement information of the user is facial movement information, the target virtual image to perform a corresponding facial interaction action;

replacing, when the movement information of the user is emotional information, the target virtual image with a target facial image associated with the emotional information, and displaying the target facial image;

controlling, when the movement information of the user is limb information, a target limb of the target virtual image to perform a limb action; and controlling, when the movement information of the user is position change information, the target virtual image to perform a corresponding position change action in the image display region.

9. The computing device according to claim 7, wherein the movement information comprises emotional information, and the controlling, according to movement information of the user captured by the target terminal, the target virtual image displayed in the image display region to perform a target interaction action corresponding to the movement information of the user comprises:

recognizing an emotional state of the user according to the emotional information to obtain a current emotional state of the user;

determining, on the basis of the current emotional state, a target facial resource matching the current emotional state; and updating the target virtual image using the target facial resource to obtain an updated target virtual image in the image display region.

10. The computing device according to claim 7, wherein the movement information comprises position change information, and the controlling, according to movement information of the user captured by the target terminal, the target virtual image displayed in the image display region to perform a target interaction action corresponding to the movement information of the user comprises:

when the position change information is movement information of a target image point, controlling the target virtual image to perform movement display in the image display region according to the movement information of the target image point; and when the position change information is movement information of a target image region, adjusting a display area of the target virtual image in the image display region according to the movement information of the target image region.

11. The computing device according to claim 7, wherein the method further comprises:

displaying an image selection window, the image selection window comprising an image selection element;

displaying, in response to a trigger operation performed on the image selection element, a reference virtual image in a reference display region, and displaying candidate virtual images in the image selection window;

updating, in response to an image selection operation performed on the candidate virtual images, the reference virtual image to be displayed as a target candidate virtual image selected by the image selection operation; and determining, in response to a virtual image confirm operation, that the target candidate virtual image is the target virtual image.

12. The computing device according to claim 7, wherein the method further comprises:

when the target terminal initiates the video session, acquiring a target image of the user;

performing feature recognition on the user in the target image to obtain a recognition result of the user; and assigning a virtual image matching the recognition result of the user as the target virtual image.

13. A non-transitory computer-readable memory storing a computer program that, when executed by a processor of a computing device acting as a target terminal in a video session, causes the target terminal to implement a method including:

displaying, by the target terminal, a video session interface, the video session interface including an image display region for displaying images associated with one or more users participating in the video session;

displaying, by the target terminal, a target virtual image of a target virtual object corresponding to a user of the target terminal in the image display region;

controlling, according to movement information of the user captured by the target terminal, the target virtual image displayed in the image display region to perform a target interaction action corresponding to the movement information of the user, further including:

determining a type of the movement information of the user based on differences of two images of the user captured by the target terminal at two different points in time;

identifying an object element of the target virtual object according to the determined type of the movement information of the user;

acquiring a set of meshes associated with the identified object element of the target virtual object, each mesh having a plurality of vertices and each vertex in the mesh having a corresponding position value and a position relationship value of the vertex relative to other vertices of the same mesh;

performing mesh deformation on the position values and the position relationship values of respective vertices in the set of meshes according to the determined type of the movement information of the user; and determining movement data of the target virtual image that has the identified object element performing the target interaction action according to the mesh deformation of the set of meshes of the identified object element of the target virtual object; and transmitting, by the target terminal, the movement data of the target virtual image performing the target interaction action, to terminals of the other users of the video session, wherein the movement data renders the target virtual image to perform the target interaction action on the corresponding terminals.

14. The non-transitory computer-readable memory according to claim 13, wherein the controlling, according to movement information of the user captured by the target terminal, the target virtual image displayed in the image display region to perform a target interaction action corresponding to the movement information of the user comprises any one or more of following operations:

controlling, when the movement information of the user is facial movement information, the target virtual image to perform a corresponding facial interaction action;

replacing, when the movement information of the user is emotional information, the target virtual image with a target facial image associated with the emotional information, and displaying the target facial image;

controlling, when the movement information of the user is limb information, a target limb of the target virtual image to perform a limb action; and controlling, when the movement information of the user is position change information, the target virtual image to perform a corresponding position change action in the image display region.

15. The non-transitory computer-readable memory according to claim 13, wherein the movement information comprises emotional information, and the controlling, according to movement information of the user captured by the target terminal, the target virtual image displayed in the image display region to perform a target interaction action corresponding to the movement information of the user comprises:

recognizing an emotional state of the user according to the emotional information to obtain a current emotional state of the user;

determining, on the basis of the current emotional state, a target facial resource matching the current emotional state; and updating the target virtual image using the target facial resource to obtain an updated target virtual image in the image display region.

16. The non-transitory computer-readable memory according to claim 13, wherein the movement information comprises position change information, and the controlling, according to movement information of the user captured by the target terminal, the target virtual image displayed in the image display region to perform a target interaction action corresponding to the movement information of the user comprises:

when the position change information is movement information of a target image point, controlling the target virtual image to perform movement display in the image display region according to the movement information of the target image point; and when the position change information is movement information of a target image region, adjusting a display area of the target virtual image in the image display region according to the movement information of the target image region.

17. The non-transitory computer-readable memory according to claim 13, wherein the method further comprises:

when the target terminal initiates the video session, acquiring a target image of the user;

performing feature recognition on the user in the target image to obtain a recognition result of the user; and assigning a virtual image matching the recognition result of the user as the target virtual image.

\* \* \* \* \*